US012585968B2

(12) United States Patent
Lui et al.

(10) Patent No.: US 12,585,968 B2
(45) Date of Patent: Mar. 24, 2026

(54) SYSTEM AND METHOD FOR TESTING MACHINE LEARNING

(71) Applicant: ROYAL BANK OF CANADA, Toronto (CA)

(72) Inventors: Yik Chau Lui, Toronto (CA); Yanshuai Cao, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 1338 days.

(21) Appl. No.: 17/227,086

(22) Filed: Apr. 9, 2021

(65) Prior Publication Data

US 2021/0319338 A1 Oct. 14, 2021

Related U.S. Application Data

(60) Provisional application No. 63/007,464, filed on Apr. 9, 2020.

(51) Int. Cl.
G06N 5/04 (2023.01)
G06N 20/00 (2019.01)

(52) U.S. Cl.
CPC .............. G06N 5/04 (2013.01); G06N 20/00 (2019.01)

(58) Field of Classification Search
CPC ................................. G06N 20/00; G06N 5/04
See application file for complete search history.

(56) References Cited

U.S. PATENT DOCUMENTS

| | | | | |
|---|---|---|---|---|
| 2017/0193052 | A1* | 7/2017 | Grehant | G06F 16/2455 |
| 2017/0300829 | A1* | 10/2017 | Iyengar | G06N 3/084 |
| 2020/0272938 | A1* | 8/2020 | Desmond | G06N 3/09 |

OTHER PUBLICATIONS

Koh et al., Understanding Black-box Predictions via Influence Functions, Jul. 2017. (Year: 2017).*
Zhang et al., Understanding Deep Learning Requires Rethinking Generalization, Feb. 2017. (Year: 2017).*
Arora et al., Fine-Grained Analysis of Optimization and Generalization for Overparameterized Two-Layer Neural Networks, May 2019. (Year: 2019).*
Rosebrock, Adrian, Why Is My Validation Loss Lower Than My Training Loss, Oct. 2019. (Year: 2019).*
Brownlee, Jason, How to Use Learning Curves to Diagnose Machine Learning Model Performance, Aug. 2019. (Year: 2019).*
Gneiting, Tilmann Making and evaluating point forecasts. Journal of the American Statistical Association 106.494 (2011): 746-762.

(Continued)

*Primary Examiner* — Marshall L Werner
(74) *Attorney, Agent, or Firm* — Norton Rose Fulbright Canada LLP

(57) ABSTRACT
A machine learning failure discriminator machine is described, along with corresponding systems, methods, and non-transitory computer readable media. The approach operates in relation to an iterative machine learning model and includes a phased approach to extract p-values from the iterative machine learning model based on modified versions of the training or validation data sets. The p-values are then used to identify whether various null hypotheses can be rejected, and accordingly, to generate an output data structure indicative of an estimated failure reason, if any. The output data structure may be made available on an API or on a graphical user interface.

20 Claims, 6 Drawing Sheets

(56)          References Cited

OTHER PUBLICATIONS

Oden, Anders, and Hans Wedel. Arguments for Fisher's permutation test. The Annals of Statistics 3.2 (1975): 518-520.

Efron, Bradley. Bootstrap methods: another look at the jackknife. Breakthroughs in statistics. Springer, New York, NY, 1992. 569-593.

Koh, Pang Wei, and Percy Liang. Understanding black-box predictions via influence functions. Proceedings of the 34th International Conference on Machine Learning-vol. 70. JMLR. org, 2017.

Zhang, Chiyuan, et al. Understanding deep learning requires rethinking generalization. International Conference on Learning-Representation, 2017.

Sanjeev Arora, Simon S. Du, Wei Hu, Zhiyuan Li, Ruosong Wang Fine-Grained Analysis of Optimization and Generalization for Overparameterized Two-Layer Neural Networks. International Conference on Machine Learning (ICML) 2019.

Torgny, Lindvall Lectures on the Coupling Method. Courier Corporation, Jan. 1, 2002, title page and p. 9.

https://docs.scipy.org/doc/scipy-0.14.0/reference/generated/scipy.stats.ks-2samp.html.

* cited by examiner

400

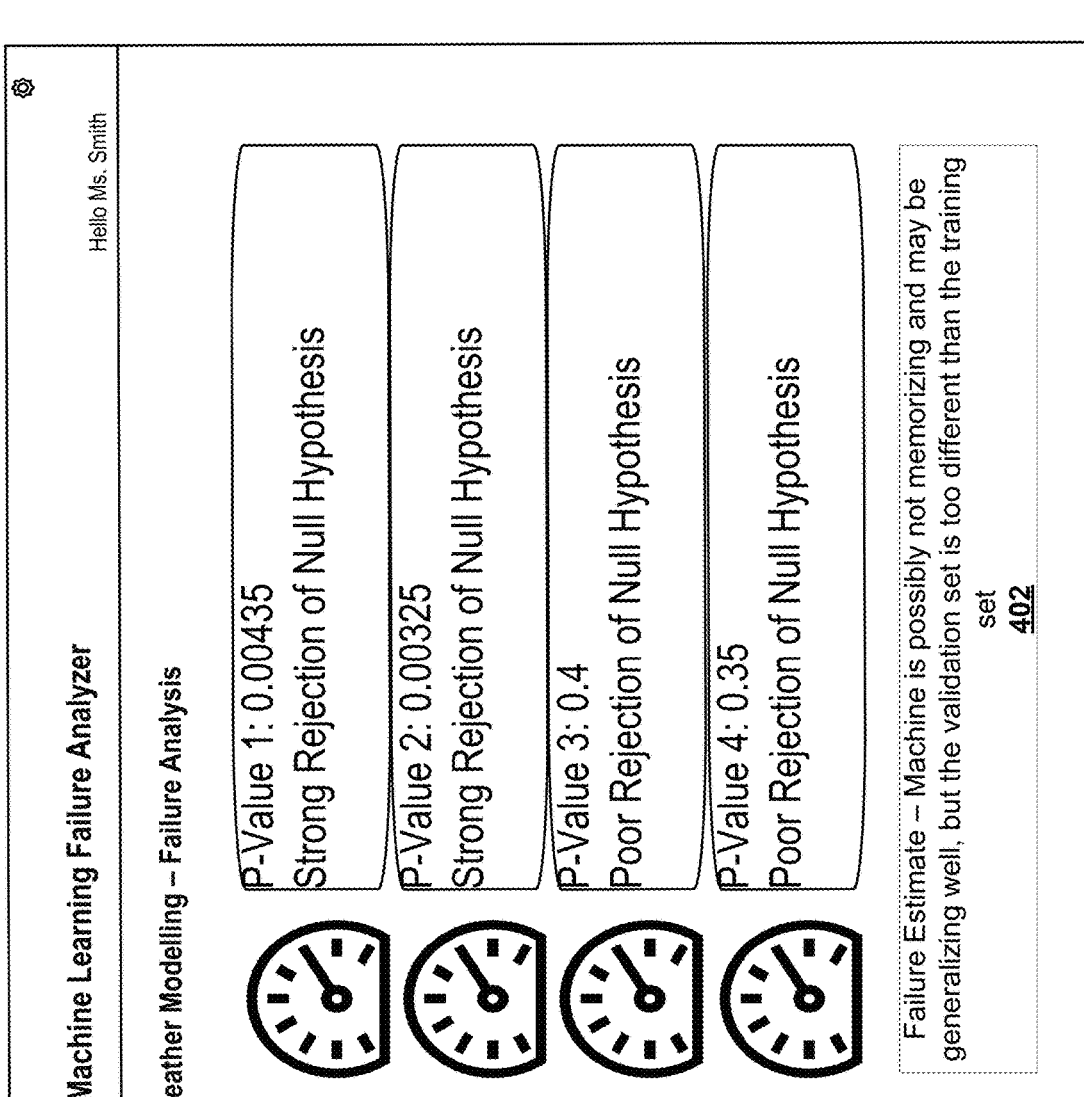

Machine Learning Failure Analyzer

Hello Ms. Smith

Weather Modelling – Failure Analysis

P-Value 1: 0.00435
Strong Rejection of Null Hypothesis

P-Value 2: 0.00325
Strong Rejection of Null Hypothesis

P-Value 3: 0.4
Poor Rejection of Null Hypothesis

P-Value 4: 0.35
Poor Rejection of Null Hypothesis

Failure Estimate – Machine is possibly not memorizing and may be generalizing well, but the validation set is too different than the training set
402

FIG. 4

600
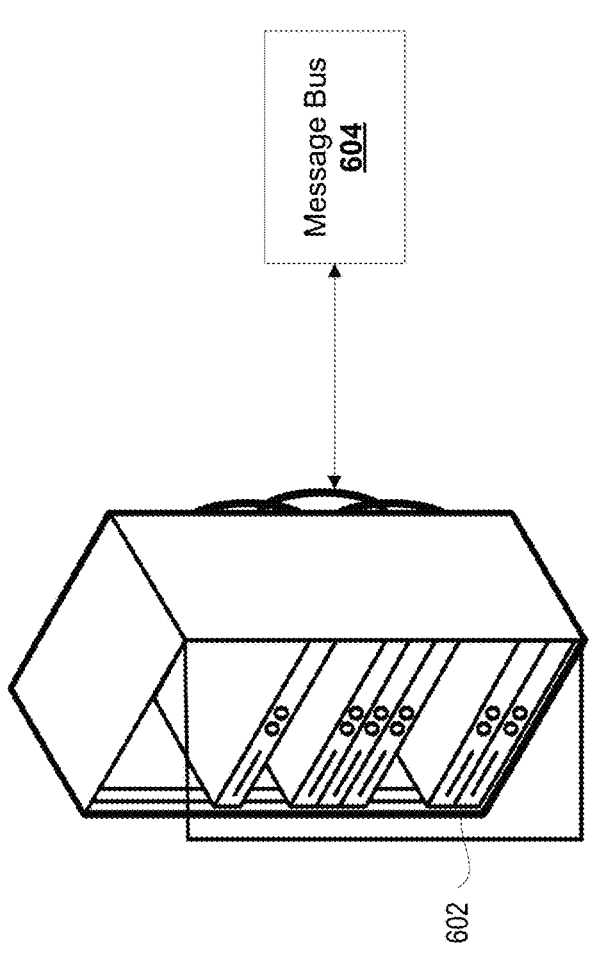
Message Bus
604
602
FIG. 6

SYSTEM AND METHOD FOR TESTING MACHINE LEARNING

CROSS-REFERENCE

This application is a non-provisional of, and claims all benefit, including priority to, U.S. Patent Application No. 63/007,464, entitled SYSTEM AND METHOD FOR TESTING MACHINE LEARNING, dated Apr. 9, 2020, incorporated herein by reference in its entirety.

FIELD

Embodiments of the present disclosure generally relate to the field of machine learning, and more specifically, embodiments relate to devices, systems and methods for testing and debugging machine learning systems.

INTRODUCTION

When a machine learning system fails, it is difficult to identify the cause for the failure. These practical problems arise more readily when machine learning systems such as neural networks are developed for real world datasets, such as tabular datasets.

In particular, consider the case of learning patterns from a noisy, non-stationary and perhaps even a small-scale tabular dataset where practitioners lack commonly accepted benchmarks and intuitions (and therefore, it is hard to build in inductive biases). It is very difficult to establish potential reasons for failure, and thus without this identification, it becomes even harder to fix/debug the issue.

With different motivations, ML production deployment practitioners are eager to develop unit testing for learning algorithms. Unlike traditional programming, unit testing statistical machine learning programs is hard because such algorithms are not written in a human-understandable procedural manner, but the outcomes of which are determined by optimization and statistical methods. It is hard to design an input where the machine learning model output is clear.

A machine learning algorithm can function properly as a program but fail silently as a learner. Practitioners therefore fall back to weaker tests: when machine learning algorithms perform well, we have some faith that the model has learnt some pattern from data. But when they seem to perform marginally better than random guesses, much less can be known: Is the training program written correctly or is it because there is no signal in the training data to begin with?

SUMMARY

A functional machine learning model in the traditional unit-tested sense may not be a machine that learnt well. It is of crucial importance to develop systematic testing algorithms, in addition to human based heuristics testing. A related issue deals with shifting from training to test data. A typical problem that plagues a data scientist in early exploration is: when a model seems to train, but it does not perform well in test time, is it because the test data distribution shifts too much, or the training algorithm learns non-robust features, and therefore doesn't adapt to the validation dataset?

A challenge with machine learning systems is that they are at the forefront of development, and tools are still being developed. Prior approaches are not practically or readily extendable to the different development paradigms of machine learning systems. For example, in prior testing approaches, the structure of the systems were more understandable and often deterministic, so detecting failures and identifying causes of failures was possible.

However, with machine learning systems, it is often difficult to understand how they operate, especially for machine learning systems that are adapted to attempt to generalize to solve previously unseen problems or adapt to changes between the training sets and the test/deployment sets. For example, a machine learning system, trained for natural language processing against language snippets from articles about animals, may be configured to be able to perform well against articles about religion. When a model (machine learning/ML system) doesn't generalize well, one can ask: is it because there are errors in the code, there is no learning signal in training data, the model doesn't learn the signal or there is a shift in test distribution? In a machine learning failure situation, quality assurance becomes even more critical.

Differentiating failure modes is a prevalent technical problem in data science and machine learning. As a rough analogy, it can be considered an extension to unit testing in traditional computer programs. Since unit testing prevails in software engineering, Applicants hypothesize that "unit testing" machine learning should also be prevalent. However, specific technical improvements and modifications are necessary as unit testing in the sense of traditional computer programs does not readily extend to the vastly different architectures of machine learning systems. As noted above, when models do not provide good results (e.g., satisfactory or useful results), practitioners need to decide whether they should continue working on the project: is it a data problem, modeling problem or is it that the data simply doesn't have much information? While the system can provide strong predictions that generalize to the articles about religion, the black box model can, for example, only include weighted interconnections between a complicated set of nodal representations that together generate the predictions. When the system fails to learn properly, it is correspondingly difficult to debug as it is not easy to determine why the machine learning model failed to learn, as there is no interpretability.

An objective of the proposed technical approach described herein in various embodiments is to distinguish between different failure modes that plague machine learning systems: (1) there is little or no signal in the data; (2) signal is present, but the model class is unable to learn such information; (3) there is too much change between training and test distributions. Another potential issue is simply that whether the ML system code is written properly (the system can learn from simulated datasets where the pattern is known). A problem that plagues a data scientist in early exploration is: when a model seems to train, but it does not perform well in test time, is it because the test data distribution shifts too much, or the training algorithm learns non-robust features, and therefore doesn't generalize in the validation dataset?

Accordingly, a set of methods for testing and debugging machine learning systems along with corresponding systems, methods, and non-transitory computer readable media are described that can be implemented as a machine learning discriminator system. To partially address the above problems, as described herein, a set of techniques for testing supervised machine learning algorithms by utilizing tools from online optimization and statistics. To Applicants' knowledge, these are the first such systematic algorithms for debugging iterative machine learning algorithms, such as gradient based learning methods, e.g. neural nets trained by stochastic gradient descent. The machine learning discriminator system can be practically implemented as a computer-based tool or a specific computer server configured for generating estimations of machine learning failure reasons (or user interfaces thereof).

Together, this system is adapted for unit testing for ML systems, where the expected behaviour of an ML system is that it can learn from training (optimization), it can generalize in identically and independently distributed (IID) settings (generalization), and it is robust to data distribution changes that often occur in deployment of real world ML system (distributional shift).

In identifying an issue, the system needs to determine (1) whether there is information/signal in the data.

This can occur when the data is collected incorrectly, e.g., when a client's data is accidentally matched with another client's (data problem). After making sure that the data is processed correctly and models can push training loss to zero faster than on a dataset with randomized targets (in this way, one can conclude that there is no model problem—this is almost always possible, as demonstrated by [6]). As described herein, there is also a computationally more efficient approach for checking code correctness in Approach I.

At this stage, the system can conclude that there is little info in the data. At this point, the system or a practitioner can terminate the project exploration in this path with some confidence. Otherwise, the practitioners are not clear whether it is the practitioner's modeling problem or a data problem. Accordingly, such a system can help save debugging time and can be a useful tool.

In scenario (2), where the model is unable to learn despite signal being present, if identified, that would suggest the practitioners to add regularization, reduce model capacity, or consider another model class or training method with better generalization performance. Without knowing this information and that from scenario (1), the practitioners will waste time because it is unclear what causes the validation result to be poor.

Understanding that an issue arises in case (3) when test distribution varies too far from training distribution can help direct the practitioners to consider models in domain adaptation or non-stationary modeling. Again without such information, the only information is that the model doesn't work, but one does not know why and does not know where to begin the fix.

In some embodiments, the system described herein is configured to automatically generate suggestions of remedial steps and may provide interface buttons or other interactive controls where a user may be able to automatically instantiate a suggested remedial step, such as obtaining a different training or test distribution, among others.

An automated approach for problem discovery widely occurring in data science and machine learning is described herein that can be implemented as a computer implemented method that can be operated by a configured computer system, for example, residing thereon in non-transitory computer readable memory for execution by one or more processors. The one or more processors do not necessarily have to be in the same computer, for example, a parallel processing architecture using multiple interconnected computers is possible. Similarly, in another embodiment, the processing architecture can include, for example, interconnected graphics processing units (GPUs) that operate in concert. As described herein, some steps may be taken in parallel where such computing infrastructure is available.

A computer system is described that includes one or more computer processors (e.g., hardware processor) that operates in conjunction with computer memory and data storage. The computer system can be configured as a "distinguisher system" which can receive as inputs various machine learning model data architectures (e.g., data structures representative of trained neural networks). The proposed approach works with iteratively trained machine learning models, and receives as inputs both the model itself and extracted n-tuples. In some embodiments, n-tuples can be extracted by an additional extractor module/engine. The n-tuples are used to provide data representations indicative of how the model was trained. The tool can be an automated machine learning failure discriminator machine, which can be used to couple to other computer systems, for example, at a data center through a message bus.

The inputs are processed in accordance with various embodiments described herein, and an output data value or data structure is generated that is indicative of a failure type. The system can be utilized for various trainable machine learning models in an iterative manner (in the sense of iterating through the dataset). The inputs can include extracted n-tuples (e.g., 5-tuples) of model training, and the input can be sets of n-tuples that are then provided to the automated machine learning failure discriminator machine.

The automated machine learning failure discriminator machine can include a phase 0 discriminator, phase 1 discriminator and a phase 2 discriminator, which may be operated independently or together (e.g., in parallel) to establish an intermediate output representing values indicative of whether a null hypothesis for at least one failure condition can be rejected. These values can be tracked, for example, as p-values, and there can be three or four failure conditions being analyzed. The p-values can then be provided as a data input into a machine learning failure discriminator engine, which then encapsulates the p-values (e.g., 3 or 4 p-values, used to represent, for example, 3 or 4 failure modes) to transform them into an output data structure, for example, storing the p-values, or storing derivative versions thereof (e.g., conversions to Booleans from floats). The output data structure can be provided or made accessible through an application programming interface, where it can then be communicated for downstream systems to engage in machine learning re-training or re-tooling, or in some embodiments, provided to a graphical user interface or other type of user interface which can provide a visual tool for practitioners to help debug their machine learning models.

In a non-limiting illustrative embodiment, for example, there can be 3 failure modes that are described, for example, using 3 or 4 possible p-values, and 5-tuples. Other variations are possible. In this example: Train mode: p-value 1: whether machine learns; Val mode: p-value 2: whether machine generalizes, when there is no distribution shift; Test mode: p-value 3: whether there is a distribution shift, p-value 4: whether test distribution is as unpredictable as random noise, if trained from training dataset (e.g., from the shuffling, the relationship between input X and output Y is broken such that it is possible to assess whether there is more significance than noise). P-value 4 can be optional in some implementation variants. Additional p-values can be determined, and alternate, different p-values are possible, in some embodiments.

The 5-tuple can be established in this example as having 5 elements: 1st element in 5-tuple: normal train loss curve; 2nd element in 5-tuple: train loss curve with Y shuffled; 3rd element in 5-tuple: normal validation loss curve; 4th element in 5-tuple: normal test loss curve; 5th element in 5-tuple: test loss curve with Y shuffled. A n-tuple can be used instead where N is a number of elements.

While the 5-tuple is shown in a non-limiting example, n-tuples are not limited to 5 elements (e.g., can also be $C''_2$; n choose 2) elements) and similarly, there may be more, or less p-values (e.g., 1, 2, 3, 4, 6, 7, 8, 9, 10 p-values). In respect of the n-tuples, the number of n may not be a performance bottleneck as the number is still relatively small relative to the available computing power. In a variant embodiment, there are always at least 5 elements in the n-tuple. In other variants, there can be fewer p-values computed. For example, in a first embodiment, all four p-values described above are determined. In a second embodiment, just the first three p-values are determined.

The fourth p-value can be useful in certain situations, for example, in the context of a prediction engine (e.g., for predicting customer needs) where an event happens that makes it so that one should not rely on the past data due to a major distribution shift (e.g., a pandemic). P-value 4 is very valuable in this situation to help the machine track what is "wrong" in the dataset due to the distribution shift. However, p-value 4 may be less required in some situations where there is no such major distribution shift.

For re-training or re-tooling, the output data values or data structure can be processed by downstream systems for rectifying the failure based on the error type, or in another embodiment, a graphical user interface system that generates one or more interactive graphical elements such as a visual control element (e.g., a rendered meter or radio button) that can be provided on a rendered graphical user interface.

While various approaches are described for gradient-based machine learning architectures, because some of the validation approaches are based on stochastic gradient descent (SGD) optimization trajectory, not all embodiments are thus limited. The proposed approach, in variant embodiments, can practically can be used for any models trainable in an iterative manner (in the sense of iterating through the dataset), but performance is not guaranteed. Applicants hypothesize that this approach is nonetheless useful through extrapolation of experimental validation results.

The automated machine learning failure discriminator machine can be provided in the form of a computer server that resides within a data center, and communicates across a message bus to retrieve message frames or packets indicative of machine learning models to be analyzed (or n-tuples thereof) and provides output data structures to be provisioned to a message bus or exposed through an API. The automated machine learning failure discriminator machine, in some embodiments, can be a rack server or other type of device/server appliance residing in a data center, or a set of distributed computing resources that are virtually assigned and provisioned as needed. For example, a specific rack server appliance can be sold that slots into a data center that is a dedicated machine, such as a debugger server. When coupled to a message bus, it can receive inputs in the form of data models and/or extracted curves in the form of data sets, and provide outputs in the form of p-values (e.g., pvalue1=0.00035, pvalue2=0.0045, pvalue3=0.7), Booleans (e.g., nullrejectTest1=TRUE, nullrejectTest2=TRUE, nullrejectTest3=TRUE, nullrejectTest4=FALSE), state estimations (failureReason=4, corresponding to failureReason="possible Distribution_Shift"), control messages (e.g., "ReRun_with_Perturbed_Hyperparameters (model7, desired_parameter_shift), "ReGenerate Dataset (trainingdataset12, validationdataset12), among others.

In the context of parallel processing, the phase 1 and phase 2 discriminators may be run on different threads, cores, or processes of a computer system to improve computational efficiency, potentially reducing the amount of time required to generate an output. This is useful as the approaches described herein, depending on the model to be analyzed, can be computationally expensive. In the context of parallel computing, there are increased benefits for parallel processing embodiments in Phase 1 ("bootstrap") phase, where all the resampled distributions are fed to the input model for training. For example, in this sense, if one has a hundred machines available, running the system of some embodiments is almost as fast as running the model once.

Systems and methods are described, along with specific machine and computer server embodiments. The methods can be encapsulated as machine-interpretable instruction sets stored thereon non-transitory computer readable medium, which when executed by one or more processors, cause the processors to perform methods as described in various embodiments herein.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 4 is a rendering of an example machine learning failure analyzer graphical user interface, controlled to be rendered on a corresponding display, according to some embodiments.

FIG. 6 is a drawing of an example computer server that can reside in a data center, according to some embodiments.

DETAILED DESCRIPTION

Figure 1:
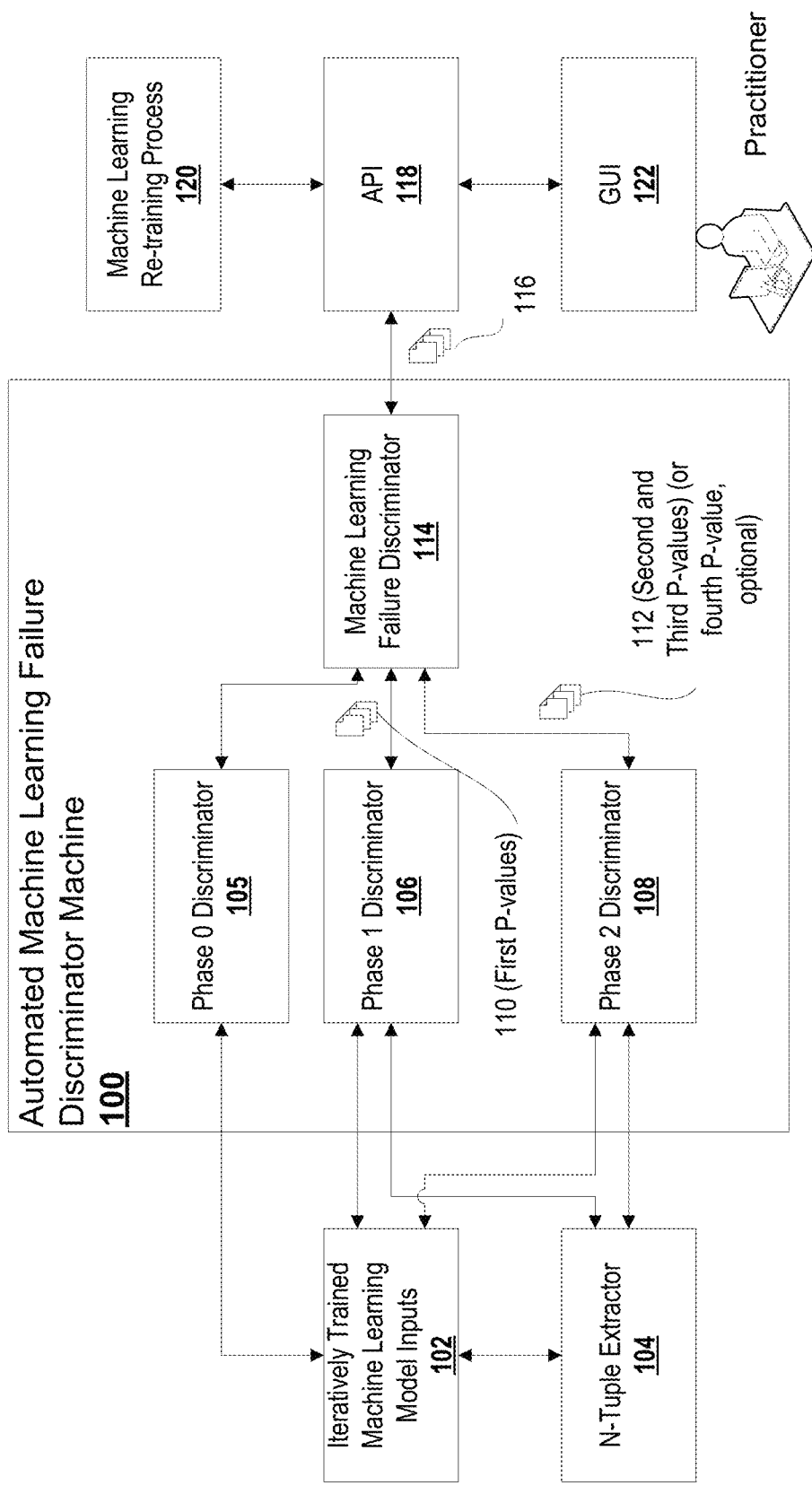
FIG. 1 is a block schematic diagram of an example system of an automated machine learning failure discriminator machine, according to some embodiments.

With different motivations, production deployment practitioners are eager to develop unit testing for learning algorithms. Unlike traditional programming, unit testing statistical machine learning programs is technically challenging because such algorithms are not written in a human-understandable procedural manner, but the outcomes of which are determined by optimization and statistical methods.

It is very challenging to design an input where the machine learning model output is clear. A machine learning algorithm can function properly as a program but fail silently as a learner.

Practitioners therefore fall back to weaker tests: when machine learning algorithms perform well, there is some faith that the model has learnt some pattern from data. But when they seem to perform marginally better than random guesses, much less can be known. A core question being, is the training program written correctly or is it because there is no signal in the training data to begin with?

A functional machine learning model in the traditional unit-tested sense may not be a machine that learnt well. It is of crucial importance to develop systematic testing algorithms, in addition to human based heuristics testing.

A related issue deals with generalization from training to test data. A typical problem that plagues a data scientist in early exploration is: when a model seems to train, but it does not perform well in test time, is it because the test data distribution shifts too much, or the training algorithm learns non-robust features?

To partially address the above problems, Applicants introduce a set of automated systems, approaches, and techniques for testing supervised machine learning algorithms by utilizing tools that are based from online optimization and statistics. To Applicants' knowledge, these are the first such systematic algorithms for debugging iterative machine learning approaches (including but not limited to gradient based learning methods, such as neural nets trained by stochastic gradient descent).

Notations will first be defined, and then relevant techniques are noted for their deficiencies. The innovations and algorithms for the improved approach are then described, along with an implementable system for this suite of tests.

Definitions

Let $Z=(X, Y)$ denote a data generating process where X is the input and Y is the target/label. Applicants assume Applicants can collect samples from the distribution, and Applicants denote $$Z_{train} = \{Z_{train,i}\}_{i=1}^{n} = (X_{train}, Y_{train}) = \{(X_{train,i}, Y_{train,i})\}_{i=1}^{n}$$

as training data. Accordingly, Applicants denote $$\{Z_{val,i}\}_{i=1}^{m} = \{(X_{val,i}, Y_{val,i})\}_{i=1}^{m}$$

as validation data, as well as $\{Z_{test,i}\}_{i=1}^{T}$ for test data. Applicants will shuffle the target Y and Applicants use the prime notation to denote a randomly permuted dataset $$Z'_{train} = \{Z'_{train,i}\}_{i=1}^{n} = (X_{train}, Y'_{train}) = \{(X_{train,i}, Y'_{train,i})\}_{i=1}^{n}.$$

Applicants use bar notation on a random variable to denote its sample mean: $\bar{X}$. Applicants denote conditional probability and expectation by $P(Y|X)$ and $E(Y|X)$. Applicants use L to represent a loss function or an evaluation criterion. Applicants abbreviate stochastic gradient descent training methods (including stochastic accelerated and adaptive methods, such as mini-batch Nesterov momentum or Adam) to SGD. The loss function can be indexed by time: $L(x_t; \theta_t)$ means the loss function evaluated at the t th iteration of data point $x_t$ with most its most recent parameter $\theta_t$. Applicants define regret of a learning algorithm at T th sample iteration as:

$$R_T = \sum_{T=1}^{T} \mathcal{L}(x_t; \theta_t) - \min_{\theta} \sum_{T=1}^{T} \mathcal{L}(x_t; \theta)$$

In words, this measures a model's online and offline performance gap.

Motivating Example: Least Squares

Perhaps one of the simplest ways to illustrate the problem setup is through linear regression. To check if the least squares algorithm is learning from the training data, Applicants can perform hypothesis testing on whether its slope differs from zero.

To test if this learnt relation generalizes, Applicants can compare $L(Y_{test}, \hat{Y}=E(Y|X=X_{test}))$, where $\hat{Y}$ is the linear regression prediction conditioning on $X_{test}$ and $L(Y_{test}, \bar{Y_{train}})=\|Y_{test}-\bar{Y_{train}}\|^2$, a simple unconditional mean based on training label. In other words, Applicants want to test whether the learnt model, when conditioning on the testing input data information, outperforms the unconditional prediction.

It is not obvious how to generalize these ideas to general learning machines such as neural nets for many reasons. First, it is hard to come up with a hypothesis test on whether a model learns from training data, since there are no transparent interpretations on a neural net's parameters. Second, even if Applicants can, it would be computationally expensive for more machines such as neural networks. Third, for different loss functions, the unconditional baseline may be hard to compute for test time comparisons.

For instance, when the loss function is mildly complicated, it may be difficult to compute the corresponding unconditional quantity. This can be seen in the MAPE evaluation metric [1] in the time series analysis literature. Computing such statistical functional for each new/modified loss function is simply not scalable. Lastly, more general machine learning, such as neural net learning, often involves non-convex optimization (v.s. convex optimization for least squares), resulting different optima each time.

Hence, if Applicants were to make this approach more broadly applicable, the optimization trajectory needs to be taken into account. The aim of this paper is to propose new methodologies that generalize the least squares setting to general supervised learning when they are trained in an iterative manner, such as SGD. In the next two sections, Applicants are going to review two sets of techniques that will provide the ingredients to the aforementioned generalization.

Problem Definition—Least Squares

Perhaps one of the simplest ways to illustrate testing ML systems is through least square linear regression. The purpose of this section is to prepare describe the unit testing ML problem. Applicants begin by looking at how this can be done for linear least squares. When a linear model doesn't learn from the training dataset, it is typically due to two reasons: 1 (model problem). the model learning code is not implemented correctly; 2. (data problem) the dataset's (X, Y) contains no learnable information (e.g. the dataset contains no learnable pattern or the data is improperly processed). It is hard to tell apriori which one is the cause: if the model code is buggy, one cannot be certain whether the dataset contains a learnable conditional relationship.

The first approach Applicants propose to unit test linear regression is to determine if the code is written correctly. The system is configured to do so by coupling the original dataset with a new synthetically constructed one, $(\tilde{X}, \tilde{Y})$, with the same marginal distributions as $(X, Y)$, but whose conditional dependency is linear and decided by us. If our code can learn from $(\tilde{X}, \tilde{Y})$, it is likely that the code is correct. After making sure the model code is correct, if the ML algorithm doesn't learn, the system can conclude there may not be any linear relationship between $(X, Y)$.

The second approach is based on t-test and F-test in linear regression hypothesis testing. Statisticians have provided a complete theory to test if there is a linear relationship between $(X, Y)$, assuming the code is written correctly (checked by our aforementioned algorithm).

The third approach uses the system to test if the previously learnt model generalizes to unseen datasets. It is a type of t-test from statistics which is equivalent to prediction interval.

Test Correctness of Least Squares Regression Coding

First, to check whether a learning algorithm is implemented correctly for least squares regression, one can simulate a toy dataset $(\tilde{X}, \tilde{Y})$, from the original one $(X, Y)$, in which one can control the linear relation, and check if the learnt parameters ($\hat{\alpha}$ and $\hat{\beta}$) are close to the optima we chose. The synthetic dataset's known linear relation helps to distinguish whether training failure comes from buggy code, model mis-specification ($(X,Y)$ conditional dependency doesn't follow a linear relationship.) or there is no conditional dependency in $(X, Y)$ (which contains the case that $(X, Y)$ is wrongly prepared or processed).

Concretely, Applicants illustrate the procedure in multiple linear regressions with d regressors and 1 target. For each random variable in $(X, Y)=(X_1, \ldots, X_d; Y)$, we compute their sample mean and sample standard deviations, denoted as $(\hat{\mu_{X_1}}, \ldots, \hat{\mu_{X_d}}; \hat{\mu_Y})$, and $(\hat{\sigma_{X_1}}, \ldots, \hat{\sigma_{X_d}}; \hat{\sigma_Y})$. For each $X_k$ for $1 \leq k \leq d$, one can obtain a new coupled random variable $\tilde{X}_k$ by re-sampling from $(X_1, \ldots, X_d)$. In this way, each $\tilde{X}_k$ is equal in distribution to $X_k$, but the probabilistic dependencies between $(X_1, \ldots, X_d)$ are destroyed. In other words, $\tilde{X}=(\tilde{X}_1, \ldots, \tilde{X}_d)$ are equal in marginal distributions to $X=(X_1, \ldots, X_d)$, but each $\tilde{X}_k$ is independent from each other.

Given $\hat{\sigma_Y}$, one can begin by solving $(\beta_1, \ldots, \beta_d)$ for the following over-determined equation:

$$\hat{\sigma_Y}^2 = \beta_1^2 \hat{\sigma_{X_1}}^2 + \ldots + \beta_d^2 \hat{\sigma_{X_d}}^2 \qquad (1)$$

For any solutions $$\beta^* = (\beta_1^*, \ldots, \beta_d^*) \qquad$$

that satisfy the above, the new random variable Z defined as $$Z = \beta_1^* \tilde{X}_1 + \ldots, \beta_d^* \tilde{X}_d$$

will have the same standard deviation as Y. However, Z and Y may not have the same sample mean. Applicants modify Z to construct a new random variable to achieve the same sample mean.

Next, let $\alpha^*$ be $\overline{Y}-\overline{Z}$, the difference between the two random variables' sample means. The random variable $$\tilde{Y} = \alpha^* + Z = \alpha^* + \beta_1^* \tilde{X}_1 + \ldots, \beta_d^* \tilde{X}_d$$

thus has the same sample mean and standard deviation as Y. Accordingly, there is constructed a new dataset or a sample from a pair of random variables, $(\tilde{X}, \tilde{Y})$ that are equal in marginal distributions to $(X, Y)$, and the conditional dependency between $\tilde{X}$ and $\tilde{Y}$ is linear.

This coupled synthetic dataset can be used to test if the algorithm can learn from it. By whether the algorithm can learn from it, Applicants mean performing hypothesis testing with null hypothesis that the learnt parameter $\hat{\beta}=\beta^*$ and there is a failure to reject this null hypothesis for this synthetic dataset. If it can, one can have faith that the least squares algorithm is written somewhat properly, i.e., it may have some minor bugs, but not buggy enough that it can still learn. In sum, one tests if a linear regression learning algorithm is properly implemented by testing its learning behaviour on a synthetic dataset where there is a known linear relationship. This decouples model mis-specification (when the given dataset doesn't follow a linear conditional dependency) problem or no learnable information in $(X, Y)$ problem from testing learning algorithm.

Test Least Squares Training

Once it can be determined that that the code is implemented correctly, one can check if the least squares algorithm is learning from the training data. The system does so by performing hypothesis testing on whether its slope differs from zero (null hypothesis $\hat{\beta}=0$). Failure to reject the null hypothesis suggests that there is no learnable signal in the data. Note that simply applying this hypothesis test doesn't allow one to conclude where the ML system's failure mode comes from since a buggy implementation can also imply that there is nothing to learn from. Therefore, there is a need to rule out such cases, by performing procedures such as Test Correctness of Least Squares Regression Coding.

As a warm-up, one begins with uni-variate linear regression problem. The t-test statistics (See section 2 and 3 of [9]) is defined as $$t_{score} = \frac{\hat{\beta} - \beta_0}{SE(\hat{\beta})} \sim \mathcal{T}_{n-2} \qquad (2)$$

where $$SE(\hat{\beta}) = \frac{\sqrt{\dfrac{1}{n-2} \sum\limits_{i=1}^{N} (y_i - \hat{y}_i)^2}}{\sqrt{\sum\limits_{i=1}^{N} (x_i - \overline{x})^2}}$$

and $\mathcal{T}_{n-2}$ is a student t distribution with n−2 degrees of freedom. The system can then select a confidence level to reject the null hypothesis. The null hypothesis is when $\beta_0=0$, in which case one assumes that there is no linear correlation between X and Y.

When shifted to multiple linear regression, one can perform a simultaneous testing for the whole regression parameter $\hat{\beta}$, by replacing t test with F test (See section 6 of [9]). F test under the null hypothesis that $\hat{\beta}=0$ is defined as:

$$F_{\hat{\beta}=0} = \frac{\sum_{i=1}^{n} (\hat{Y}_i - \bar{Y})^2 / (p-1)}{\sum_{i=1}^{n} (\hat{Y}_i - Y_i)^2 / (n-p)} \qquad (3)$$

This random variable will follow F distribution with (d, n−d+1) degrees of freedom. (A similar argument based on the t test applies here, but for each individual parameter). One can therefore test the null hypothesis whether we have learnt any linear relations from the training data.

Test Least Squares Generalization

Knowing that the model learns from the training data, Applicants test if this learnt relation generalizes, both for validation data that follows the same distribution as train data or test time data when there is a distribution shift. One can compare $\mathcal{L}(Y_{val}, \hat{Y}) = \mathbb{E}(Y|X=X_{val})$, where $\hat{Y}$ is the linear regression prediction conditioning on $X_{val}$ and $\mathcal{L}(Y_{val}, \overline{Y_{train}}) = \|Y_{val} - \overline{Y_{train}}\|^2$, a simple unconditional mean based on training label. In other words, Applicants want the system to test whether the learnt model when conditioning on the testing input data information outperforms the unconditional prediction. While this is intuitively sound, the comparison doesn't quantify the randomness: is the difference significant? Is this a signal or the difference is due to noise?

To address it rigorously, Applicants can perform hypothesis testing on the prediction using t-statistics (See section 3.5 of [9]). Concretely, by setting $\beta_0 = \mathbb{E}\hat{\beta} = \hat{\beta}$, where the last $\hat{\beta}$ is considered as a point estimate for $\beta$. For a new observation $x_{new}$, we can compute the prediction distribution under the null hypothesis $\beta_0 = \hat{\beta}$:

$$t_{score} = \frac{\hat{y} - y_{new}}{\hat{\psi}_n} \sim \mathcal{T}_{n-d+1} \qquad (4)$$

where $$\hat{\psi}_n = \sqrt{\hat{\sigma}^2 + (SE(\hat{y}))^2}, \ \hat{\sigma}^2 = \frac{1}{n-2}\sum_{i=1}^{n} \hat{e}^2$$

is the sum of squared regression residual errors, and $$SE(\hat{y}))^2 = \hat{\sigma}^2 \left(x_{new}^T (X^T X)^{-1} x_{new}\right).$$

Combining the three approaches above, it looks like there is a reasonable way to "unit test" least squares learning algorithms, by testing whether the code is written properly, the algorithm trains and the algorithm generalizes, using the language of statistical hypothesis testing. Applicants recall that this can be viewed as a generalization of unit test, since the expectation of an ML is that it learns from training, generalizes to validation and is robust to test time distributional shifts. As ML software involves randomness, this is a reasonable expected behaviour one can hope for.

Beyond Testing Least Squares

Having examined the least squares case, it seems natural to "unit test" learning algorithms by framing it as a statistical hypothesis testing problem. However, it is not obvious how to generalize these ideas (except the first test above) to general learning machines such as neural nets for many reasons. First, it is hard to come up with a hypothesis test on whether a model learns from training data, since there are no transparent interpretations on a neural net's parameters. It is even more so for the corresponding test statistics functional (i.e., like the t-test). Second, even if one could, it would be computationally expensive for neural nets. Third, for different loss functions, the unconditional baseline may be hard to compute for test time comparisons. For instance, when the loss function is mildly complicated, it may be difficult to compute the corresponding unconditional quantity. This can be seen in the evaluation metric in the time series forecast literature [1].

Computing such statistical functional for each new/modified loss function is simply not scalable, not to mention their corresponding statistical inferences (such as the t-test or F-test for least squares). Lastly, more general machine learning, such as neural net learning, often involves non-convex optimization (versus convex optimization for least squares), resulting different optima each time. Hence, if one were to generalize this, the optimization trajectory needs to be considered in one way or another. The aim of some of the proposed approaches described herein is to propose new methodologies that adapt the least squares setting to supervised learning based on SGD (or other types of iterative learning algorithm). In the next section, Applicants describe three sets of techniques that will provide the ingredients to the aforementioned generalization to provide a useful tool for machine learning failure discrimination.

Technique I: Coupling from Probability

The coupling method [2] is an approach from probability theory and is used in statistics [3], [4]. It is also showing resurgent interests in machine learning [6], [5]. Roughly, the coupling method studies two random variables X and Y by creating a random vector Z' whose marginal distributions correspond to X and Y respectively. The choice of Z' is to relate X and Y in a particularly desirable way. Applicants have re-developed and extended the least squares hypothesis testing from the angle of coupling, leading to new algorithms and approaches that generalizes beyond least squares, and an automated failure detection machine is described in various embodiments herein.

Recall the linear regression's hypothesis testing technique. The technique tests whether the estimated slope $\hat{\beta}(Z_{train})$ is different from zero, which indicates that there is no linear conditional dependency between X and Y (null hypothesis). One way to reinterpret the test is whether running linear regression on a training dataset is anywhere different from running it on a dataset where there is no linear relation.

This interpretation leads to coupling: Applicants pair the old dataset $$\{Z_{train,i}\}_{i=1}^{n} = \{(X_{train,i}, Y_{train,i})\}_{i=1}^{n}$$

with another dataset $$\{Z'_{train,i}\}_{i=1}^{n} = \{(X_{train,i}, Y'_{train,i})\}_{i=1}^{n}\}$$

where the prime notation indicates that the label Y has been shuffled. In the shuffled case, there would be no linear relation. This newly coupled dataset provides a benchmark for the null hypothesis that there is no linear relation. If there was a linear relation $$\{Z_{train,i}\}_{i=1}^{n},$$

the least squares estimate should behave rather differently from $$\{Z'_{train}\}_{i=1}^{n}.$$

In words, Applicants desire to measure how much conditional information X has about Y by comparing it to a coupled dataset (X, Y') where they are independent. Via re-sampling methods, Applicants can simulate two distributions of the least squares estimators: $\hat{\beta}(Z_{train})$ and $\hat{\beta}(Z'_{train})$. Applicants can then perform hypothesis testing going beyond least squares. Greater details will be given. Applicants argue this coupling powered testing is more broadly applicable.

Technique II: Bootstrap from Statistics

The reinterpretation above however comes at a cost: linear regression hypothesis testing comes with a closed form t-test. One also needs a way to perform hypothesis testing. This can be done by bootstrap from statistics. Via re-sampling methods, one can simulate two distributions of the least squares estimators: $\hat{\beta}(Z_{train})$ and $\hat{\beta}(Z'_{train})$. The approach can then include performing non-parametric hypothesis testing on these two distributions of estimates. Greater details will be given below. Bootstrap gives a more flexible way of performing statistical inferences. Applicants observe that this coupling and bootstrapped powered testing is more broadly applicable. This is because: 1) coupling doesn't require specifications of a null hypothesis on the parameter space, which is too complex to do so for machines such neural nets; 2) bootstrap doesn't require a parametric distribution on the test statistics to be specified (student t in the least squares case with Gaussian assumptions, and unknown for neural nets). These kinds of apriori specifications are reasons that prevent the least squares approaches from generalizing.

Technique III: Data Dependent Optimization Convergence Rate

Optimization is an old but active discipline in applied mathematics. In modern large scale machine learning, stochastic optimization algorithms are essentially a dominant approach for machine learning training. For example, even for least squares regressions, learning by inverting the sampling design matrix is not scalable to large datasets. One typically recasts this matrix inversion problem to an optimization one, due to the latter approach's faster computing time. It is natural that the optimization community studies various first order optimization algorithms' convergence rates. In the approaches described herein, linear model hypothesis testing is revisited and extended via an online optimization convergence rate analysis.

Due to the strong convexity for the least squares loss and linear models' interpretability, one can discard the particular optimization trajectory and focus on the learnt parameters $\hat{\beta}(Z_{train})$.

On one hand, from the coupling perspective, this is to compare the behaviour of the least squares estimator's behaviour on $\{Z_{train}\}$ and $\{Z'_{train}\}$ (where $(X_{train}, Y_{train})$ are independent due to shuffling). On the other hand, from an optimization angle, this asks if SGD converges faster in $$\{Z_{train}\}_{i=1}^{n} \text{ than } \{Z'_{train}\}_{i=1}^{n}.$$

Heuristically, assuming there is signal in $Z_{train}$, SGD should be able to find commonality between the samples in $$\{Z_{train}\}_{i=1}^{n}$$

and lowers the training loss at a rate depending on the signal to noise ratio in the samples. However, when $$\{Y_{train}\}_{i=1}^{n}$$

is shuffled, then there will be no conditional dependency in $$\{Z'_{train}\}_{i=1}^{n}.$$

and hence the optimization would be a lot harder and converges more slowly. The best learning strategy might just be "memorizing" each sample $$\{Z'_{train}\}_{i=1}^{n}.$$

Applicants therefore propose to compare the online optimization convergence rates when the same neural net is trained on $$\{Z_{train}\}_{i=1}^{n}$$

and the corresponding rate on $$\{Z'_{train}\}_{i=1}^{n}.$$

The convergence rate can be considered as a generalization of the slope in the least squares estimator, summarizing the strength of the conditional dependency. Any reasonable functionals derived from the online loss curve are sensible, such as regrets or training loss evaluated after the first epoch). The convergence rate can be considered as a generalization of the slope in the least squares estimator, summarizing the strength of the conditional dependency.

Applicants' work is inspired by [7], which may be the first work that proves gradient descent convergence rate depending on the relationship strength between X and Y, in an offline optimization setting. As to be seen in the next section, online optimization which blends well with bootstrap, offers practical advantages in hypothesis testing.

The approach is different than that of [7], which may be the first work that proves gradient descent convergence rate depending on the strength between X and Y, in an offline optimization setting. As to be seen in the next section, online optimization has practical advantages in hypothesis testing. Moreover [7] addresses neither unit testing machine learning, nor offers hypothesis testing based on optimization.

Applicants discuss a motivation of the approach from a signal to noise ratio perspective. As described in earlier, the proposed unit testing framework is about decoupling the failure modes of a machine learning system.

Of particular importance is in the training phase, when Applicants would like to test the amount of information contained in the data. The work in the training phase is therefore about testing signal to noise ratio in the dataset. Applicants give an alternative interpretation of the work by [7] and view the corresponding quantity as a "signal to noise ratio" replacement for the more general SGD based neural net learning.

Consider the following matrix $H^\infty$ defined at the initialization of a 2-layer fully connected neural network, with ReLU activation, on n samples, where the initial weight w is sampled from standard Gaussian $w \sim \mathcal{N}(0, I)$:

$$H_{ij}^\infty = \mathbb{E}_{w \sim \mathcal{N}(0,I)}[x_i^\top x_j \mathbb{1}\{w^\top x_i \geq 0, w^\top x_j \geq 0\}] \qquad (5)$$

$$= \frac{x_i^\top x_j (\pi - \arccos(x_i^\top x_j))}{2\pi}, \forall i, j \in [n] \qquad (6)$$

This matrix $H^\infty$ essentially represents how a neural network "sees" the dataset (X, Y), at initialization. More deeply, this "signal to noise" ratio governs how quickly a neural net can learn:

$$\mathcal{L}(W(k)) \approx \frac{1}{2}\|(I - \eta H^\infty)^k y\|_2^2, \forall k \geq 0 \qquad (7)$$

where $\mathcal{L}$ is the loss function, W(k) is the weight at iteration/epoch k, and $\eta$ is the learning rate. To illustrate the idea, assume $\eta=2$. If $$H^\infty \approx \frac{1}{2}I,$$

then the learning will happen very quickly and the convergence to global optimum happens in a few iteration.

Applicants interpret this projection of the target y onto the matrix $H^\infty$ as a "signal to noise ratio" like quantity, quantifying how much information X contains about the target Y, through the lens of a neural network. To sum, the more information X contains about Y, the faster the convergence rate for the two layer neural net above.

Applicants' hypothesis is that in the online setting, similar phenomena occur. On one hand, the $H^\infty$ for an offline dataset may be replaced by its mini-batch counter part. On the other hand, due to the online setting, an extra quantity is the relation between $H^\infty$ in different mini-batches. At the implementation level, Applicants propose to look at the online convergence rate (or other functions derived from the online learning loss curve) to determine the information X contains about Y. This forms the basis for the unit testing approach.

Example System Design

FIG. 1 is a block schematic diagram of an example system of an automated machine learning failure discriminator machine 100, according to some embodiments.

A computer system is described that includes one or more computer processors (e.g., hardware processor) that operates in conjunction with computer memory and data storage. The computer system can be configured as a "distinguisher system" which can receive as inputs various machine learning model data architectures (e.g., data structures representative of trained neural networks).

The proposed approach works with iteratively trained machine learning models, and receives as inputs either the model itself and/or extracted n-tuples. The tool can be an automated machine learning failure discriminator machine, which can be used to couple to other computer systems, for example, at a data center through a message bus. The n-tuples can be extracted by an additional extractor module/engine. The n-tuples are used to provide data representations indicative of how the model was trained.

The inputs 102 are processed in accordance with various embodiments described herein, and an output data value or data structure 116 is generated that is indicative of a failure type. The system can be utilized for various machine learning algorithms trainable in an iterative manner (in the sense of iterating through the dataset). The inputs 102 can include extracted n-tuples (e.g., 3-tuples, 4 tuples, or 5-tuples) of model training, and the input can be sets of n-tuples that are then provided to the automated machine learning failure discriminator machine 100 that are extracted from an N-tuple extractor 104.

In a non-limiting illustrative embodiment, for example, there can be 3 failure modes that are described, for example, using 4 possible p-values, and 5-tuples. Other variations are possible. In this example: Train mode: p-value 1: whether machine learns; Val mode: p-value 2: whether machine generalizes, even if there is no distribution shift; Test mode: p-value 3: whether there is a distribution shift, p-value 4: whether test distribution is as unpredictable as random noise, if trained from train dataset.

The n-tuple can be established in this example as having 5 elements: 1st element in 5-tuple: normal train loss curve; 2nd element in 5-tuple: train loss curve with Y shuffled; 3rd element in 5-tuple: normal validation loss curve; 4th element in 5-tuple: normal test loss curve; 5th element in 5-tuple: test loss curve with Y shuffled.

The n-tuples can be varied, for example, there can be 3-tuples, 4 tuples, 5-tuples, 6-tuples, etc. In some embodiments, there are at least 5 in the n-tuples (e.g., minimum 5 tuples).

The inputs 102 are provided from machine learning models that operate through iterative training (e.g., training where there are loops conducted through data sets). An example iterative training, for example, can include feeding 10 data points into a system from a total of 10,000 data points, and looping through the data set repeatedly (e.g., for a number of training mini batches). Training losses can be updated at each iteration such that over a period of time, ideally the training loss should decrease as new data points are provided into the system.

The N-tuple extractor 104 can extract 5-tuples that represent the training loss curves, which are established over a history of training. For example, each 5-tuple can be indicative of, at a particular epoch or training step, what the losses are established for training, validation, and real data sets. Accordingly, each 5-tuple can be a vector or a set of points (Curve1, Curve2, Curve3, Curve4, Curve5; where each curve is indexed by mini-batches/training step #)) and represented in an array or a data set, which can be combined together to form an input data structure for a particular machine learning model. These n-tuple sets can be thus used to establish distributions of losses that can be established (1) over time, or (2) based on data generation. Each of these 5-tuples can be obtained for a corresponding sample such that the distribution can be established from the 5-tuples (e.g., for a (5, 100, 1000) data array, there are 5 tuples (x-axis), where each tuple is a distribution of curves with 100 resampled curves (y-axis) and each one of out of the 100 curves has 1000 iterations/mini-batches (z-axis)).

The automated machine learning failure discriminator machine 100 can include a phase 1 discriminator 106 and a phase 2 discriminator 108, which may be operated independently or together (e.g., in parallel) to establish an intermediate output representing values indicative of whether a null hypothesis for at least one failure condition can be rejected. The n-tuples from N-tuple extractor 104 are received and provided as inputs, and processed to establish the intermediate values. Example steps for processing are described in sections below in reference to FIG. 2 and FIG. 3.

These values can be tracked, for example, as p-values 110, 112, and there can be three failure conditions being analyzed. There can be four failure conditions in other embodiments, as described herein, or more failure conditions (or also less), in variant embodiments.

A first p-value 110 can be indicative of how strongly a null hypothesis can be rejected where the null hypothesis is indicative of whether the machine learning model is merely memorizing the training data and not developing a useful mechanism for actual learning.

The second p-value (one of p-values 112) can be indicative of how strongly a null hypothesis can be rejected where the null hypothesis is indicative of whether the machine learning model is unable to generalize from the training data.

The third p-value (one of p-values 112) can be indicative of how strongly a null hypothesis can be rejected where the null hypothesis is indicative of an unstable environment (e.g., changes between the training and validation set) such that even if the machine learning model can generalize, the differences are so significant that it cannot work in the validation set. In this case where the null hypothesis cannot be rejected for the third p-value, it may indicate that the failure cannot be blamed on the failure of the machine learning model itself.

A fourth p-value can be tracked as part of 112, which can be indicative of an amount of shift (e.g., as unpredictable as random noise).

In this example: Train mode: p-value 1 110: whether machine learns; Val mode: p-value 2 112: whether machine generalizes, even if there is no distribution shift; Test mode: p-value 3 112: whether there is a distribution shift, p-value 4 112: whether test distribution is as unpredictable as random noise, if trained from train dataset.

The p-values 110, 112 can then be provided as a data input into a machine learning failure discriminator engine 114, which then encapsulates the p-values 110, 112 to transform them into an output data structure 116, for example, storing the p-values 110, 112, or storing derivative versions thereof (e.g., conversions to Booleans from floats). The output data structure 116 can be provided or made accessible through an application programming interface (API) 118, where output data structure 116 can then be communicated for downstream systems to engage in machine learning re-training or re-tooling (e.g., by machine learning re-training process 120), or in some embodiments, provided to a graphical user interface 122 or other type of user interface which can provide a visual tool for practitioners to help debug their machine learning models.

For re-training or re-tooling by machine learning re-training process 120, the output data values or data structure 116 can be processed by downstream systems for rectifying the failure based on the error type, or in another embodiment, the graphical user interface 112 can control a display adapter to generate one or more interactive graphical elements such as a visual control element (e.g., a rendered meter or radio button) that can be provided on a rendered graphical user interface.

In this section, Applicants present the main proposed approaches for testing iterative learning algorithms such as neural nets trained by SGD. There are four major parts of the proposed approaches, according to various embodiments. The first one generalizes the least squares regression code checking, which reduces general ML code checking to checking linear regressions. The second one replaces the least squares estimator by convergence rate, regrets or training loss after the first epoch as the test statistics in the training phase. The third and last one extend least squares generalization by looking at the distributions of validation losses and test losses via bootstrap.

Approach I: Checking Code Correctness

In this section, Applicants are going to describe the approach for approximately testing the null hypothesis that $$\mathcal{L}_{1epoch}^{AG}(\tilde{Z}_{train}) \text{ and } \mathcal{L}_{1epoch}^{LS}(\tilde{Z}_{train})$$

are equal in distribution (Other test statistical functional derived from the loss curve, such as regret or convergence rate should also work, but for comparison with linear least squares, training loss after 1 epoch should suffice), where $\tilde{Z}_{train}$ is a synthetic dataset to be constructed below, $\mathcal{L}_{1epoch}^{LS}$ represents loss after 1 epoch and LS refers to least squares trained by SGD and $\mathcal{L}_{1epoch}^{AG}$ stands for loss after 1 epoch and AG stands for a general iterative learning algorithm. The main approach is to reduce code checking for a general ML algorithm to code checking for least squares, which is considerably easier.

Recall the pain when a data scientist cannot train his/her model. Is it because the code is improperly written or there is no learnable information from the dataset? To check the code is implemented correctly, Applicants couple the original dataset Z=(X, Y) with a synthetic dataset $\tilde{Z}=(\tilde{X}, \tilde{Y})$ This aspect can be conducted by a Phase 0 Discriminator 105. The synthetic dataset $\tilde{Z}$ ideally should have the same scale as the original one (i.e. each random variable has the same marginal distribution as the original one), so that scaling isn't a confounding factor. At the same time, $\tilde{Z}$ should be as simple as possible so that it is easy to debug. Having a linear conditional dependency between $\tilde{X}$ and $\tilde{Y}$ appears to be a good one. Applicants remark that the two datasets Z and $\tilde{Z}$ only differ in the way their conditional dependency structure, but otherwise identical as probabilistic objects.

To check a general machine learning algorithm is implemented correctly using This aspect can be conducted by the Phase 0 Discriminator 105, the Phase 0 Discriminator 105 is configured to compare learning behaviour to simpler to debug algorithm which achieves nearly optimal performance on $\tilde{Z}$. Naturally, Applicants choose the easy algorithm to be least squares, since $\tilde{X}$ and $\tilde{Y}$ are constructed to have linear conditional dependency. If the machine learning algorithm achieves performance comparable to the optimal model on $\tilde{Z}$, it is likely that the code is implemented correctly. Therefore, Applicants have reduced the problem of checking code quality for a general ML algorithm to the problem of: 1. checking a linear model is correct and let it learn on $\tilde{Z}$; 2. comparing a general learning algorithm to the linear model on $\tilde{Z}$, and this can be performed by the Phase 0 Discriminator 105 as an input into the machine learning failure discriminator 114.

Applicants describe the approach below.

Step 1 (compute sample mean and standard deviation): Given the original dataset Z=(X, Y) with d regressors and 1 target. For each random variable in (X, Y)= $(X_1, \ldots, X_d; Y)$, Phase 0 Discriminator 105 computes their sample mean and sample standard deviations, denoted as $(\widehat{\mu_{X_1}}, \ldots, \widehat{\mu_{X_d}}; \widehat{\mu_Y})$, and $(\widehat{\sigma_{X_1}}, \ldots, \widehat{\sigma_{X_d}}; \widehat{\sigma_Y})$.

Step 2 (create a synthetic input dataset $\tilde{X}$ that is equal in marginal distribution to X, but whose marginal distribution is independent from each other and from Y): For each $X_k$ for $1 \le k \le d$, Phase 0 Discriminator 105 can obtain a new coupled random variable $\tilde{X}_k$ by re-sampling from $X=(X_1, \ldots, X_d)$. In this way, each $\tilde{X}_k$ is equal in distribution to $X_k$, but the probabilistic dependencies between $(X_1, \ldots, X_d)$ are destroyed. In other words, $\tilde{X}=(\tilde{X}_1, \ldots, \tilde{X}_d)$ are equal in marginal distributions to $X=(X_1, \ldots, X_d)$, but each $\tilde{X}_k$ is independent from each other.

Step 3 (create a synthetic target $\tilde{Y}$ that is equal in marginal distribution to Y, and linearly dependent on $\tilde{X}$ but is independent from Y): Given $\widehat{\sigma_Y}$, Phase 0 Discriminator 105 begins by solving $(\beta_1, \ldots, \beta_d)$ for the following over-determined equation:

$$\widehat{\sigma_Y}^2 = \beta_1^2 \widehat{\sigma_{X_1}} + \ldots + \beta_d^2 \widehat{\sigma_{X_d}} \tag{8}$$

For any solutions $$(\beta_1^*, \ldots, \beta_d^*)$$

that satisfy the above, the new random variable Z defined as $$Z = \beta_1^* \tilde{X}_1 + \ldots, \beta_d^* \tilde{X}_d \tag{60}$$

will have the same standard deviation as Y (Recall by construction, $\tilde{X}=(\tilde{X}_1, \ldots, \hat{X}_d)$ are equal in marginal distributions to $X=(X_1, \ldots, X_d)$ but each random variable is independent from each other since they are coupled re-sampled versions of the original distributions). However, Z and Y may not have the same sample mean. Phase 0 Discriminator 105 modifies Z to construct a new random variable to achieve the same sample mean. Next, let $\alpha^*$ be $\bar{Y}-\bar{Z}$, the difference between the two random variables' sample means. The random variable $$\tilde{Y} = \alpha^* + Z = \alpha^* + \beta_1^* \tilde{X}_1 + \ldots, \beta_d^* \tilde{X}_d$$

thus has the same sample mean and standard deviation as Y. Applicants have thus constructed a new dataset or a sample from a pair of random variables, $(\tilde{X}, \tilde{Y})$ that are equal in marginal distributions to $(X, Y)$, and the conditional dependency between $\tilde{X}$ and $\tilde{Y}$ is linear.

Step 3' (create a synthetic label $\tilde{Y}$ that is equal in marginal distribution to Y, and is close to Y's label distribution): When Y follows discrete distributions, i.e. for classification problems, Phase 0 Discriminator 105 can similarly create a synthetic label distribution $\tilde{Y}$ that is equal in distribution to Y. The procedure Applicants outline here is based on the same mechanisms behind multinominal logistic regressions.

Assume there are d inputs, K categories, and n datapoints. Applicants want to find $$(\beta_1^*, \ldots, \beta_{K-1}^*) \in \mathbb{R}^{d \times (k-1)},$$

where each $\beta_k$, $1 \le k \le K-1$, such that, for all k:

$$\mathbb{P}(Y = k) = \frac{1}{n}\sum_{i=1}^{n} \mathbb{I}(Y_i = k) = \frac{1}{n}\sum_{i=1}^{n} \frac{\exp(\beta_k X_i)}{\sum_{k=1}^{K} \exp(\beta_k X_i)} \tag{9}$$

In practice, Phase 0 Discriminator 105 can solve the above approximately. For example, Phase 0 Discriminator 105 can apply gradient descent or stochastic gradient descent to find $$(\beta_1^*, \ldots, \beta_{K-1}^*):$$

$$(\beta_1^*, \ldots, \beta_{K-1}^*) = \min_{(\beta_1, \ldots, \beta_{K-1})} \mathcal{L}(P_{data}, P_{model}) \tag{10}$$

where $P_{data}=(\mathbb{P}(Y=1), \ldots, \mathbb{P}(Y=K))$ are the empirical probabilities of the labels calculated from the data Y, $$P_{model} = \left( \frac{1}{n}\sum_{i=1}^{n} \frac{\exp(\beta_1 X_i)}{\sum_{k=1}^{K} \exp(\beta_1 X_i)}, \ldots, \frac{1}{n}\sum_{i=1}^{n} \frac{\exp(\beta_K X_i)}{\sum_{k=1}^{K} \exp(\beta_K X_i)} \right)$$

are the predicted probabilities of the softmax model, and $\mathcal{L}$ is any reasonable loss function between the two probabilities, such as cross-entropy.

Now, generate $\tilde{Y}_i$ for each $X_i$ as the category k that achieves the maximum of $$P_{model} = \left( \frac{1}{n} \sum_{i=1}^{n} \frac{\exp(\beta_1^* X_i)}{\sum_{k=1}^{K} \exp(\beta_1^* X_i)}, \cdots, \frac{1}{n} \sum_{i=1}^{n} \frac{\exp(\beta_K^* X_i)}{\sum_{k=1}^{K} \exp(\beta_K^* X_i)} \right). \tag{5}$$

For example, if the maximum predicted probability is at k=1 for sample $X_i$, then $\tilde{Y}_i = (1, 0, \ldots, 0)$. In this way, the system generated a dataset $(\tilde{X}, \tilde{Y})$ where $\tilde{X}$ is equal in marginal distribution as X and $\tilde{Y}$ approximately equals in distribution as $\tilde{Y}$.

Step 4 (Resample from $\tilde{Z} = (\tilde{X}, \tilde{Y})$ to create bootstrap subsamples): Given $$\tilde{Z} = \{\tilde{Z}_{train,i}\}_{i=1}^{n} = \{(\tilde{X}_{train,i}, \tilde{Y}_{train,i})\}_{i=1}^{n},$$

the system creates n/k subsamples of $$\{\tilde{Z}_{train,i}\}_{i=1}^{n} \tag{25}$$

by randomly removing k points from it, without replacement. Phase 0 Discriminator 105 therefore has n/k simulated distributions of training datasets, each with n−k samples. By treating $$\{\tilde{Z}_{train,i}\}_{i=1}^{n}$$

as the population, re-sampling from it mimics the sampling noise and simulate an algorithm's dependence on particular subsamples. Applicants denote such subsample by $$\{\tilde{Z}_{train}^{i,j}\}_{i=1,j=1}^{n-k,n/k},$$

where the i indexes a data point and j indexes which bootstrapped subsample of $\{\tilde{Z}_{train}\}$ Phase 0 Discriminator 105 chooses from. Applicants remark that other subsampling procedure will also work. The main approach is to get a set of samples so that the system can apply non-parametric hypothesis testing.

Step 5 (Get distribution of training losses from $$\{\tilde{Z}_{train}^{i,j}\}_{i=1,j=1}^{n-k,n/k}$$

for both least squares and the iterative learning algorithm): Since there is a distribution of datasets, for each subsample indexed by j, the system can compute the corresponding training losses distributions after 1 epoch of training. Applicants note that the least squares should also be trained by mini-batch SGD for a fair comparison. So Applicants have:

$$\{\mathcal{L}_{1epoch}^{LS}(\tilde{Z}_{train}^{i,j})\}_{i=1,j=1}^{n-k,n/k}$$

for an iterative learning algorithm, indexed by AG, and $$\{\mathcal{L}_{1epoch}^{LS}(\tilde{Z}_{train}^{i,j})\}_{i=1,j=1}^{n-k,n/k}$$

for the least squares algorithm, indexed by LS. The system therefore has n/k data subsets, each with sample size n−k, for both algorithms.

Step 6 (Test the hypothesis that both algorithms learn equally well): In this step, the system applies non-parametric testing (e.g. two-sample Kolmogorov-Smirnov test, [8]) to test these two distribution of losses. The null hypothesis is that $$\{\mathcal{L}_{1epoch}^{LS}(\tilde{Z}_{train}^{i,j})\}_{i=1,j=1}^{n-k,n/k}$$

are equal in distribution to $$\{\mathcal{L}_{1epoch}^{LS}(\tilde{Z}_{train}^{i,j})\}_{i=1,j=1}^{n-k,n/k}.$$

In general, one cannot expect other algorithms to outperform least squares on a dataset with linear conditional dependency. But it should be close enough. In other words, one can expect a big p-value, so that there is a failure to reject the null hypothesis.

After selecting a threshold, if the system fails to reject the null hypothesis, the system can be configured to conclude that the code is written properly as a learning algorithm in that it achieves comparable performance to least squares on a dataset with linear conditional dependency. This assumes that the least squares code is properly written, but this can be checked by procedures such as Test Correctness of Least Squares Regression Coding. This concludes the first testing stage.

Approach II: Learning in Training Time

In this section, Applicants describe an approach using phase 1 discriminator 106 for approximately testing the null hypothesis that $Y_{train}$ and $X_{train}$ are independent (or low signal to noise ratio).

Figure 2:
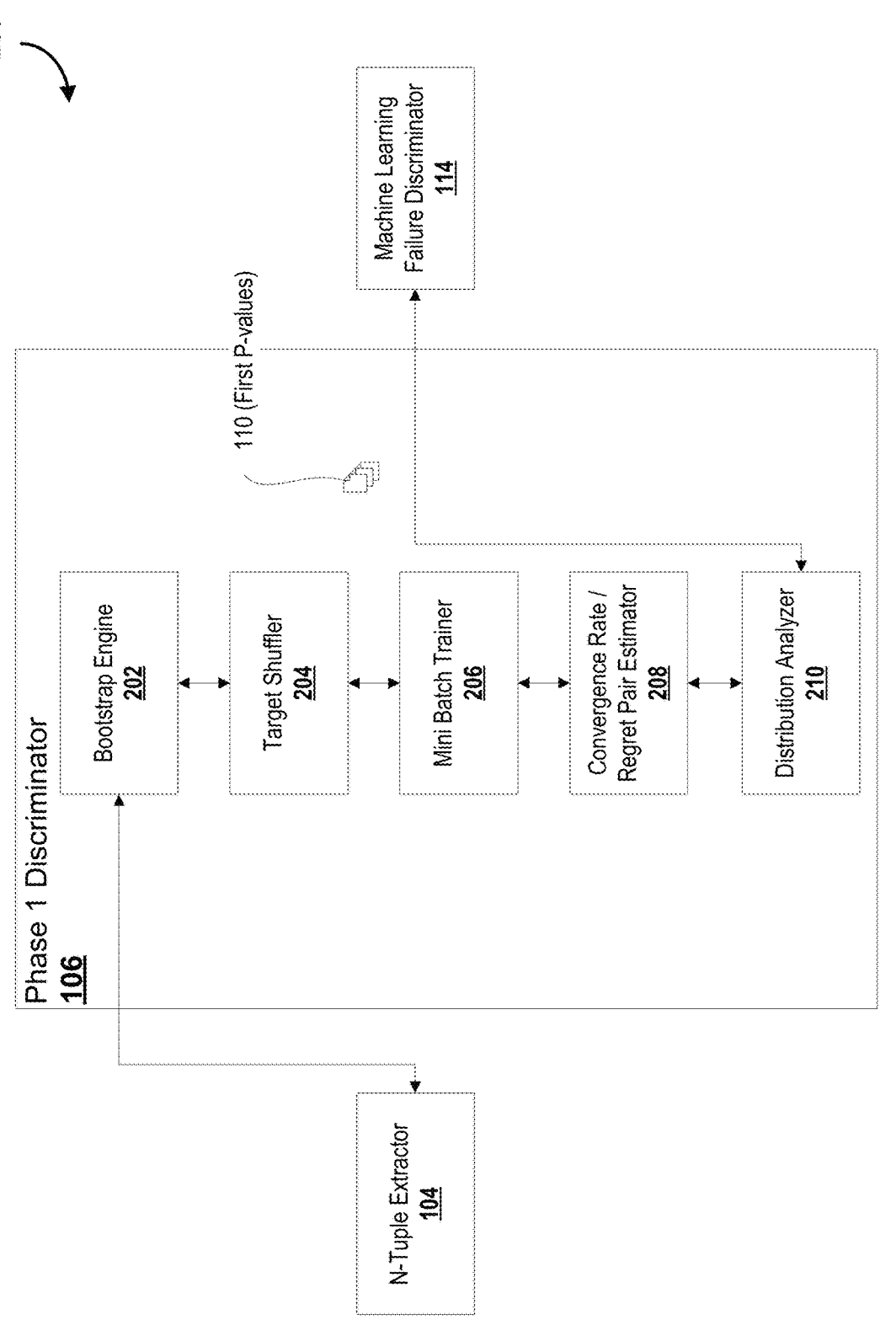
FIG. 2 is a block schematic diagram of an example phase 1 discriminator of an automated machine learning failure discriminator machine, according to some embodiments.

FIG. 2 is a block schematic diagram of the example phase 1 discriminator 106 of an automated machine learning failure discriminator machine 100, according to some embodiments. The example phase 1 discriminator 106 can include bootstrap engine 202, target shuffler 204, mini batch trainer 206, convergence rate/regret pair estimator 208, and distribution analyzer 210.

The phase 1 discriminator 106 can be implemented using the processor(s) of machine 100, and in some embodiments, can be a separate software or hardware module or chip component (e.g., chipset, integrated circuit component, system on a chip).

The phase 1 discriminator 106 is utilized to establish the first p-value(s) 110, which is directed to a null hypothesis in respect of memorization of training set by the machine learning model. If the null hypothesis is true, then $Z'_{train} = (X_{train}, Y'_{train})$ would be equal in joint distribution to $Z_{train} = (X_{train}, Y_{train})$. Thus, any procedure/algorithm AG acting on both datasets should return similar outputs with high probability. Conversely, if the outcomes were different, the machine 100 can reject the null hypothesis. Applicants describe the approach in greater details below.

Step 1 (create bootstrap sub-samples of $Z_{train}$ via bootstrap) (conducted, for example, by bootstrap engine 202 to establish the distribution being scaled/quantified for rigorous hypothesis testing as a standardized measure so that one can determine that the difference between two numbers is significant):

Given $$Z_{train} = \{Z_{train,i}\}_{i=1}^{n} = \{(X_{train,i}, Y_{train,i})\}_{i=1}^{n},$$

the bootstrap engine 202 is configured to create n/k subsamples of $\{Z_{train}\}_{i=1}^{n}$ by randomly removing k points from it, without replacement. The bootstrap engine 202 therefore has n/k simulated distributions of training datasets, each with n−k samples. By treating $\{Z_{train,i}\}_{i=1}^{n}$ as the population, re-sampling from it mimics the sampling noise and simulate the machine learning model's dependence on particular subsamples.

Applicants denote such subsample by $$\{Z_{train}^{i,j}\}_{i=1,j=1}^{n-k/k},$$

where the i indexes a data point and j indexes which bootstrapped subsample of $\{Z_{train}\}$ the system chooses from, and outputs from this step are the n/k subsamples which the machine 100 can use as a new sample for each model.

Step 2 (Couple $Z_{train}$ with $Z'_{train}$ by shuffling the target Y):
For each $$\{Z_{train}^{i,j}\}_{i=1,j=1}^{n-k,n/k},$$

the target shuffler 204 shuffles the target Y to create $$\{Z_{train}'^{i,j}\}_{i=1,j=1}^{n-k,n/k}.$$

In the training sample, there will be a curve and hopefully, the convergence rate (e.g., The slope in the linear regression case→the convergence rate or regret computed from the train loss curve in the general case) of the curve will show the interdependence between X and Y. The shuffling is important as it can be utilized to modify this relationship so that an analysis can be conducted where the interrelationship is broken between X and Y. The shuffling allows for a comparison of the linear model with positive or negative slope between X and Y with a model with slope 0. The term "slope" is used for illustrative purposes—in the case of linear regression, for example. Such slope would not exist in general models that are of interest. This slope concept in linear regression, is replaced by, convergence rate or regret computed from various train, validation and test loss curves.

Shuffling Y breaks the dependency of the Y on X, and therefore, the analysis that is conducted with the neural network should mimic the relationship in a least squares approach, having slope 0.

By shuffling using target shuffler 204, the machine 100 does not need to interpret the neural network model directly (e.g., the algebra cannot be practically analyzed anyways), and this is an important distinction from traditional hypothesis testing for linear models where the testing mechanism would know both the algorithm and the desired output. In general machine learning, the corresponding desired output is a system that can "generalize", which unlike for unit testing, is not intelligible.

Each resampled data set has a corresponding a shuffled version generated, each data set having n−k samples.

In a simplified example for illustration purposes, $Z_{train}$ has n samples, each sample having a pair X and Y if one regards each pair of data sets as having dimension 1, and a 1×n vector in available after resampling. After resampling, there would be n/k data sets, each data set has n−k data points. These resampled data sets form a 2D array, having dimension (n−k)×(n/k). Now, when the system shuffled the corresponding label/target Y to create Y', one can obtain a 3D array with dimension (n−k)×(n/k), where the first dimension is now two because there are now both the original version and the shuffled version.

Step 3 (Train neural nets for one epoch on both $Z_{train}$ and $Z'_{train}$): The machine 100 using phase 1 discriminator 106 then trains the neural network 102 on both $$\{Z_{train}^{i,j}\}_{i=1,j=1}^{n-k,\frac{n}{k}} \text{ and } \{Z'_{train}^{i,j}\}_{i=1,j=1}^{n-k,\frac{n}{k}}$$

using mini-batch trainer 206.

Note that the machine 100 runs only one epoch of the trainings dataset with mini-batch size B. This traces a loss curve (assuming the dataset has (n−k) data points, one will have a loss curve with a total of (n−k)/B time steps, and each step there is a loss: $L(x_t; \theta_t)$, where t ranges from 1 to (n−k)/B) with certain convergence rate, which can be stored on data storage as an intermediate output data structure.

This is an important technical consideration as compared to usual neural network training where training is conducted across many epochs (e.g., looking through the data multiple times, one time for each epoch), this approach is computationally less expensive as the data is only iterated across one epoch (or less as described in a variant below).

Mini batches of size B are established to provide for n/B iterations, for a dataset of size n. In a variant embodiment, the mini batches do not necessarily need to span across an entire epoch. A drawback of this variant is that there may be information loss within an epoch as the dataset is not covered fully even once.

Batch size B selection by mini-batch trainer 206 can be important in some aspects; if B is too small, the loss function optimization process may be too noisy and difficult, and if B is too large, the estimation of convergence rate or regret from the loss curve may be poor, simply because the loss curve is too short or there is too much deviation from the regret definition. In case practitioners choose to iterate through the dataset many times, it can also give incentive for the neural network to memorize, confounding the experiments for hypothesis testing.

During the training, loss curves are established and stored. There are 5+ curves, Z and Z' (shuffled) represented in the data. For each for the n/k data sets, the mini-batch trainer 206 establishes going to have one curve, and that curve is that for the n−k data point. The convergence rate of loss curves is analogous to the slope in least squares; the curve will show the loss decreasing, rate of it will be indicative of how fast.

Step 4 (Compute distributions of test statistics on both $Z_{train}$ and $Z'_{train}$): The convergence rate/regret pair estimator 208 can be configured to numerically estimate the convergence rates for both cases from their training loss curves. The machine 100 is thus able to determine a convergence rate for each case of the n/k cases (If the design allow overlaps between the sub-samples, the machine 100 can create $$C_k^n$$

cases. For simplicity, this example depicts n/k cases but other variations are possible). Due to the sampling noise, machine 100 thus has two distributions of convergence rates $R_{train}$ (for $Z_{train}$) and $R'_{train}$ (for $Z'_{train}$). For regret pairs, there is no need for numerical estimation.

There are various test statistics from training loss that the system can compute. For example, one can compute the training loss after 1 epoch where every sample in the training set is used once, as the test statistics. Since there are two distributions of data subsets, when computing training losses on them, the system gets two distributions of training losses, denoted as $R_{train}$ and $R_{train}'$.

As an alternative, one can look at regret of this online pass of dataset as a test statistic. Recall regret is defined as:

$$R_T = \sum_{t=1}^{T} \mathcal{L}(x_t; \theta_t) - \min_{\theta} \sum_{t=1}^{T} \mathcal{L}(x_t; \theta_t) \qquad (11)$$

where T stands for the number of iteration in the first epoch of training (a dataset of size 100 with mini-batch size 10 will give T=100/10=10) i.e. regret is the gap between online performance and offline performance. Due to the work of [6], one can determine that the second term is close to zero for neural nets with sufficient capacity. Therefore, the system can be configured to compute:

$$R_T = \sum_{t=1}^{T} \mathcal{L}(x_t; \theta_t) \qquad (12)$$

as a reasonable and computationally cheap approximation to the true regret. This leads to two distributions of regrets $R_{train}$ and $R_{train}'$.

As a last example of such test statistics, one can numerically estimate the convergence rates for both datasets from their training loss curves. The system therefore, have a convergence rate for each case of the n/k cases (If one allows overlaps between the subsamples, the system can create $$C_k^n$$

cases. For simplicity, in this example, Applicant stays with n/k cases). This leads to two distributions of convergence rates $R_{train}$ and $R_{train}'$.

Applicants remark that any test statistics that is derived from the training loss curve may be a reasonable function for testing the null hypothesis. The three examples discussed (convergence rate, regret, training loss after 1 epoch) are by no means exhaustive. Applicants use $R_{train}$ and $R_{train}'$ to denote such possible test statistics below.

Step 5 (Statistical Hypothesis Testing): The distribution analyzer 210 is configured to perform hypothesis testing (e.g., two-sample Kolmogorov-Smirnov test) to check if $R_{train}$ and $R'_{train}$ are equal in distribution. If equal in distribution, that that means that the neural network is not learning anything from the data (indicative of a failure to reject the null hypothesis). A failure to reject the null hypothesis corresponds to a big p value for step 1).

The first p-value 110 is captured as a data structure output for provisioning to machine learning failure discriminator 114. The first p-value can be used to indicate rejection of the null hypothesis, but is still limited in an ability to explain as it is still not sufficient to support the alternative to the null hypothesis.

Moreover, since the neural network's offline optimization can push loss to zero given enough capacity, in some embodiments, Applicants can perform the above testing on the regrets pair ($R_T$, $R'_T$) instead of convergence rates ($R_{train}$, $R'_{train}$).

Recall, as described earlier, that:

$$R_T = \sum_{t=1}^{T} \mathcal{L}(x_t; \theta_t) - \min_{\theta} \sum_{t=1}^{T} \mathcal{L}(x_t; \theta)$$

from [6], one can determine that neural networks with sufficient capacity can push the second term to zero. As a result, it is possible to compute $R_T$, since the first term can be computed online. The advantage of using regret is that it does not require any numerical estimation procedure such as convergence rate. On the other hand, the relation between neural network optimization and data's signal to noise ratio is known [7] in the offline setting, while there lacks a corresponding relation for regret, so one may argue it is less transparent to use regret. But intuitively, regret and convergence rate are closely related. As a rough analogy, regret is similar to how far one can drive (the lower the regret, the more loss one is able to manage to reduce, the farther one can go), and convergence rate is how fast one can drive. When travel time is fixed, regret and convergence rate has a direct relation.

So far, Applicants have omitted a critical point: the procedure AG is restricted to be neural networks trained by SGD. It is possible that AG is too weak at rejecting the null hypothesis. The drawback of the proposed method is that it is model and optimization dependent. Issues related to optimizations such data processing, normalization, initialization of the parameters, etc. can affect the approaches' Type I and Type II error.

It is an approximate hypothesis testing subject to model mis-specification risks as in statistical testing. For example, there are learnable patterns, but Applicants fail to reject the null hypothesis because either the neural network architecture has high bias or variance, or the SGD optimization setup was poor for this particular architecture.

For example, there may be a failure to reject the null hypothesis because either the neural net architecture has high bias or variance, or the signal to noise ratio in the dataset requires more samples, etc. Applicants remark that some of these problems can be mitigated by having better model class or iterative learning algorithm. The framework broadly applies to iterative learning algorithm, and the above is not a constraint in the framework itself, but practical issues that machine learning practitioners should be aware of.

There are four possibilities, as in typical hypothesis testing:

Case I: Assume the null hypothesis ($X_{train}$ and $Y_{train}$ are independent) is true. In other words, there is no signal or the signal to noise ratio is too low for any learner with respect to the training sample size. If the methodology does not reject the null hypothesis, then this is a true negative.

Case II: If the null hypothesis is true, but the methodology rejects the null hypothesis, then approach is producing a Type I error (false positive). When this occurs, it might be due to the bootstrapped training sampling. This probably can minimized by manufacturing several bootstrapped samples.

There are two sources of randomness when conducting the hypothesis testing approaches: 1. The sampling noise in the data from the unknown population distribution; 2. The bootstrap/resampling noise when one attempts to mimic the data generating mechanism. The first source is not controllable, while the errors from second source can be minimized by conducting training on more bootstrapped samples, at the expense of more (parallel) computation.

Case III: Assume the null hypothesis is false. In other words, there is learnable signal from the training sample. If the methodology does not reject null hypothesis, then Applicants are making a Type II error (false negative). This is a challenging case: it can be learnability issue or an optimization issue. On the learnability side, it could be that the neural net architecture is too biased (under-fitting) for $Z_{train}$, causing difficulty or inefficiency in SGD's online learning, or it could be the neural net architecture or the optimization is not robust to noise in $Z_{train}$, leading to high variance. From an optimization perspective, it could be that the machine 100 utilized suboptimal hyperparameters for SGD or inappropriate initialization.

Case IV: If the null hypothesis is false, and the methodology rejects the null hypothesis, then the true positive is found.

Approach III: Generalizing in Validation Phase

In this section, Applicants are going to describe the approach for approximately testing the null hypothesis that $Z_{train}$ and $Z_{valid}$ come from the same distribution. By approximately testing, Applicants mean that the procedure is subject to limitation of neural nets trained by SGD. It is reminiscent to model mis-specification risks as in statistics. In this section, Applicants describe the approach and algorithm for approximately testing three null hypotheses.

1. The convergence rate/regret/loss pair ($R_{train}$ and $R_{valid}$) computed from $Z_{train}$ and $Z_{valid}$ are equal in distribution. (This measures whether the machine learning algorithms generalizes, when the validation dataset equals training dataset in distribution).

The first hypothesis is that the learning algorithm generalizes (under IID assumptions between the train and validation). Rigorously, the null hypothesis is that the chosen test statistics in train and validation datasets are equal in distribution. For example, $R_{train}$ and $R_{valid}$ are equal in distribution, where R can be losses computed after one epoch of training for training and validation datasets. Regret or convergence rates are also sensible test statistics, but they are subject to sample size differences. This is because when regret is computed for the whole validation dataset, it is estimated on far more samples than the counter part in training. For this reason, Applicants use training loss after 1 epoch as an illustration.

2. The losses ($R_{train}$ and $R_{test}$) computed from $Z_{train}$ and $Z_{test}$ come from the same distribution (this measures how much performance degrade comes from nonstationary distribution shift, rather than a model's failure to learn). The second hypothesis is that the learning algorithm is robust to test time distribution shifts. Technically, it is similar to the first hypothesis, in that one tests the null hypothesis is that the chosen test statistics in validation and test datasets are equal in distribution.

3. ($R_{test}$ and $R'_{test}$) computed from $Z_{test}$ and $Z'_{test}$ are equal in distribution (this measures how unpredictable $Z_{test}$ is by comparing the model's performance on a dataset where there is no signal). By approximately testing, Applicants mean that the procedure of some embodiments can be subject to limitation of neural networks trained by SGD. The last hypothesis to test is that the validation loss performance is better than random. This test is interesting when the signal to noise ratio in a dataset is low, given the finite sample size. Imagine the training loss test statistics in step 5 of Approach II gives a reasonably big p-value, i.e. one can bare reject the null hypothesis that there is learnable signal. In this case, how much this learnt signal from train carries out to the validation or test needs to be carefully compared and tested. The solution is by comparing the validation performance to a randomly created dataset.

Figure 3:
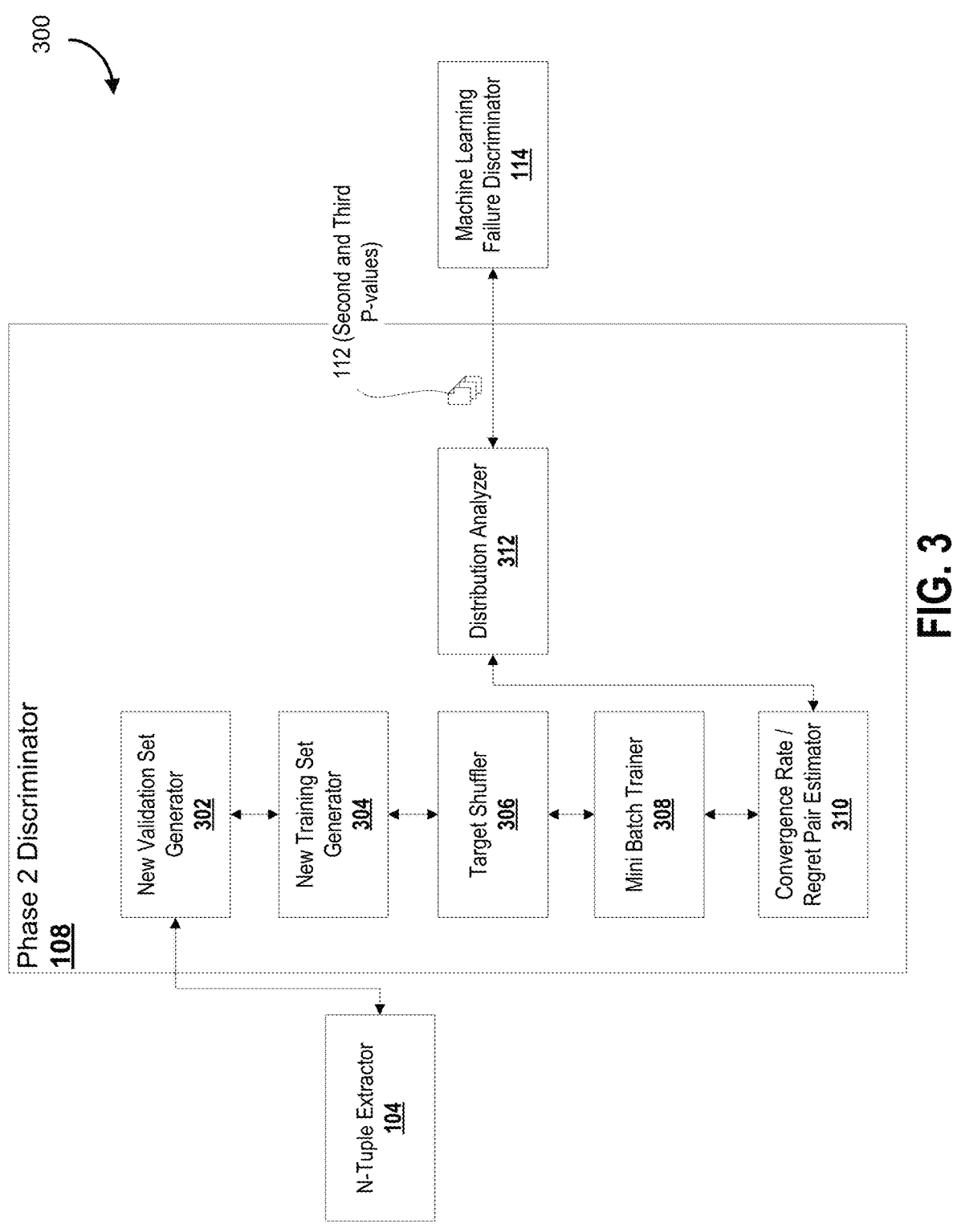
FIG. 3 is a block schematic diagram of an example phase 2 discriminator of an automated machine learning failure discriminator machine, according to some embodiments.

FIG. 3 is a block schematic diagram of an example phase 2 discriminator 108 of an automated machine learning failure discriminator machine 100, according to some embodiments.

Phase 2 discriminator 108 can include a new validation set generator 302, a new training set generator 304, a target shuffler 306, a mini-batch trainer 308, a convergence rate/regret pair estimator 308, as well as a distribution analyzer 310. These components can be implemented in physical or logical submodules or subroutines that can be processed by a computer processor or multiple computer processors operating in conjunction. The Phase 2 discriminator 108 can, in some embodiments, be run in parallel with the Phase 1 discriminator 106. The parallel speedup is most natural on the n/k bootstrapped training datasets. The output of the Phase 2 discriminator 108 is an output data structure that includes the second and third p-values 112. The second and third p-values 112 can be encapsulated and transmitted to the machine learning failure discriminator 114. In FIG. 3, only second and third p-values are shown, but in a variant embodiment, other p-values, such as p-value 4 described further in can be included as well.

Step 1 (Training, Validation and Test sets creation): Given $$\{Z_{train,i}\}_{i=1}^{n}$$

and $$\{Z_{test,i}\}_{i=1}^{m}.$$

Assuming m>>n, Applicants create new copies of data as follows. Applicants randomly sample m data points from $$\{Z_{train,i}\}_{i=1}^{n} \text{ to form } \{Z_{valid,i}\}_{i=1}^{m}.$$

In this step, the new validation set generator 302 forms a new validation set from the training set by picking random points.

Step 2: The new training set generator 304 generates a new training data set from the remaining n−m data points. The remaining n−m data points form new training dataset $$\{Z'_{train,i}\}_{i=1}^{n-m}.$$

Step 3: The machine 100 shuffles the target Y in $$\{Z'_{valid}\}_{i=1}^{m}$$

to form $$\{Z''_{valid}\}_{i=1}^{m}.$$

The shuffling is conducted by the target shuffler 306. To sum, there is one training dataset:

$$\{Z'_{train,i}\}_{i=1}^{n-m}$$

(a slightly smaller dataset), three validation datasets:

$$\{Z_{valid,i}\}_{i=1}^{m}$$

(original validation dataset), $$\{Z'_{valid,i}\}_{i=1}^{m}$$

(new validation dataset spawned from $$\{Z_{train,i}\}_{i=1}^{n}) \text{ and } \{Z''_{valid,i}\}_{i=1}^{m}$$

(target Y shuffled validation dataset). Note that there are $C_m^{\ n}$ ways of sub-sampling the above datasets.

Applicants remark that $$\{Z_{valid,i}\}_{i=1}^{m}$$

may or may not be equal in distribution to $$\{Z_{train,i}\}_{i=1}^{n-m}.$$

For this reason, the system creates $$\{Z'_{valid,i}\}_{i=1}^{m} \text{ from } \{Z_{train,i}\}_{i=1}^{n}$$

so that one can make sure $$\{Z'_{valid,i}\}_{i=1}^{m}$$

is equal in distribution to $$\{Z_{train,i}\}_{i=1}^{n-m}.$$

As mentioned earlier $$\{Z''_{valid,i}\}_{i=1}^{m}$$

is created as a random baseline to compare the model's validation dataset performance. This is needed when the signal to noise ratio in the dataset is low, with respect to the dataset size.

Step 4 (Compute distributions of validation loss curves): The mini-batch trainer 308 then is configured to pick k out of the $C_m^{\ n}$ sub-sampled datasets and train the neural network by SGD (in alternate embodiments, non-SGD approaches are possible and contemplated—various iterative training algorithms can be utilized). At each mini-batch iteration, mini-batch trainer 308 can compute the validation losses for $$\{Z_{valid,i}\}_{i=1}^{m}, \{Z'_{valid,i}\}_{i=1}^{m}, \text{ and } \{Z''_{valid,i}\}_{i=1}^{m},$$

denoting them as $$(\mathcal{L}_{valid,t}^{1}, \mathcal{L}_{valid,t}^{2}, \mathcal{L}_{valid,t}^{3}),$$

where t denotes the t the mini-batch iteration. Note that along with the training losses computed on $$\{Z_{train,i}\}_{i=1}^{n-m}, \{Z'_{train,i}\}_{i=1}^{n-m}, \text{ i.e. } (\mathcal{L}_{train,t}^{1}, \mathcal{L}_{train,t}^{2}),$$

there are a 5-tuple $$(\mathcal{L}_{train,t}^{1}, \mathcal{L}_{train,t}^{2}; \mathcal{L}_{valid,t}^{1}, \mathcal{L}_{valid,t}^{2}, \mathcal{L}_{valid,t}^{3})$$

of losses. The system therefore has three distribution of loss curves where the randomness comes from sub-sampling in training or validation.

The mini-batch trainer 308 then generates five distributions of loss curves where the randomness comes from sub-sampling in training or validation phase.

Step 5 (Compute test statistics for validation datasets): The convergence rate/regret pair estimator 310 then receives a data structure storing the three distributions representative of loss curves from mini batch trainer 308, and convergence rate/regret/loss pair estimator 310 is configured to take validation loss after 1 epoch of training as R, and to compute the validation losses for all three datasets: $(R_1, R_2, R_3)$ for $$\left(\mathcal{L}^1_{valid,t}, \mathcal{L}^2_{valid,t}, \mathcal{L}^3_{valid,t}\right)^T_{t=1},$$

and therefore giving three distributions of validation losses.

Alternatively, the convergence rate/regret/loss pair estimator 310 can simply use regret tuples, convergence rate or loss tuples.

The disadvantages of convergence rate or regret when comparing such test statistics to the training phase is that the sample sizes are not equal and this affects the whole loss curve. Concretely, when computing regret for training, each loss $\mathcal{L}_{train,t}$) is estimated on a mini-batch of datasets, with size B. However, when computing $\mathcal{L}_{valid,t}$), the sample size can be the whole validation dataset size. For this reason, Applicants recommend using training and validation losses after one epoch. Since this is only one number (instead of using a whole curve), standard non-parametric tests like two-sample Kolmogorov-Smirnov test as in [8] can handle the unequal sample sizes.

When the system chooses the validation loss after 1 epoch as a testing statistics, Applicants remark that the system can optionally include additional losses to the above, which can be any unconditional statistics for the target/label Y. For example, one can let $R_4 = \overline{Y_{train}}$ and $R_5 = \overline{Y_{valid}}$, i.e. the sample means of the targets in the training dataset and the validation dataset. By including these test statistics, one can test whether the validation predictions conditional on the inputs can outperform the unconditional quantities such as sample means of Y. This is analogous to the above description for least squares. As for classification problems, $R_4$ and $R_5$ would be the modes for the classes in the training dataset or the validation dataset.

Step 6: Based on the convergence rates, the distribution analyzer 312 performs hypothesis testing (e.g. two-sample Kolmogorov-Smirnov test) to test the hypotheses in the above section.

The precise hypotheses are:

$R_1$ and $R_2$ are equal in distribution—whether the learning algorithm generalizes in IID setting;

$R_1$ and $R_3$ are equal in distribution—whether the learning algorithm performs better than random chances in validation stage.

If $R_{train,1}$ and $R_{valid,1}$ are equal in distribution (whether the machine generalizes when the test time distribution is the same as training phase), and whether $R_{valid,1}$ and $R_{valid,2}$ are equal in distribution (whether there is a distribution shift in test time). As well as whether $R_{valid,2}$, and $R_{valid,3}$ are equal in distribution (whether the test time distribution is unpredictable).

The distribution analyzer 312 conducts determinations against pairs of $R_{train,1}$, $R_{train,2}$; $R_{valid,1}$, $R_{valid,2}$, $R_{valid,3}$. 1st In comparing $R_{train,1}$, $R_{train,2}$, when they are equal in distribution, it would suggest that the machine is not learning signal from the data or there is no signal in the data. 2nd When comparing $R_{train,1}$ and $R_{valid,1}$, if they are equal in distribution, that would suggest that the machine learning algorithm shows little sign of overfitting, it generalizes very well to an environment where the test distribution does not change. 3rd In a comparison of the original validation set with new validation set spawned from the original, $R_{valid,1}$ and $R_{valid,2}$, if they are equal, that may help indicate that the environment is more or less fixed. In this case, one can expect the machine if it can do well in validation, it can do well in the real world because the data distribution does not overly change. 4th In comparing $R_{valid,2}$, and $R_{valid,3}$, if the performances—distributions equal, may be indicative of a failure condition, where while the shuffled data set should contain no information, but if the outputted losses behave in such a manner, it is indicative that the validation environment changes so much that it causes the failure. Such a failure may not be attributable to the machine learning model itself, but rather the environment as between validation (as a deployment environment proxy) and training.

Combined Phased Approach in Practice

In this section, Applicants describe an approach to combine approaches above to describe how the system may apply them in practice, according to an embodiment.

Phases above (e.g., Phases II and III) can be run in parallel, in some variant embodiments. The benefits of parallelization are in the ability to reduce runtime requirements or to take advantage of parallel processing architectures. As in above, the most speed up will come from the bootstrapped step. As the mini-batch training steps can be fairly computationally expensive, scaling up with model size and data set sizes, there can be significant benefits to doing so. In other embodiments, they can be run independently of each other. Parallelization is useful to conserve computing resources.

Step 0: The machine Discriminator 105 checks the code correctness.

Step 1: Given $$\{Z_{train,i}\}^n_{i=1} \text{ and } \{Z_{test,i}\}^m_{i=1}.$$

The machine 100 splits $$\{Z_{train,i}\}^n_{i=1}$$

randomly to $$\{Z_{train,i}\}^{n-m}_{i=1} \text{ and } \{Z_{valid,i}\}^m_{i=1} = \{Z_{train,i}\}^m_{i=1}.$$

Note that $$\{Z_{train,i}\}^m_{i=1}$$

have the same number of samples as $$\{Z_{valid,i}\}^m_{i=1}.$$

Step 2: The machine 100 establishes $$\{Z_{new-train,i}\}_{i=1}^{n-m} = \{Z'_{train,i}\}_{i=1}^{n-m}$$

as a new training dataset. The machine 100 performs Approach 2 to test whether there $X_{new-train,i}$ and $Y_{new-train,i}$ are independent. In other words, the machine 100 is testing the null hypothesis whether there is a conditional dependency between $X_{new-train,i}$ and $Y_{new-train,i}$.

Step 3: While performing Step 2, for each training trajectory, the machine 100 obtains three validation loss curves $$\left(\{Z_{valid,i}^3\}_{i=1}^{m}, \{Z'_{valid,i}\}_{i=1}^{m}, \{Z_{valid,i}^m\}_{i=1}^{m}\right]\left[(\mathcal{L}_{valid,t}, \mathcal{L}_{valid,t}^2, \mathcal{L}_{valid,t}^3\right),$$

computed from $$\left(\{Z_{valid,i}\}_{i=1}^{m}, \{Z'_{valid,i}\}_{i=1}^{m}, \{Z''_{valid,i}\}_{i=1}^{m}\right)\right]$$

as in Approach 3. In here, machine 100 is testing the null hypotheses that $Z_{train,i}$ and $Z_{valid,i}$ are equal in distribution.

Step 4: Following step 3, machine 100 can test another hypothesis that $\mathcal{L}(Y_{valid}, \hat{Y}(X_{valid}))$ and $\mathcal{L}(Y'_{valid}, \hat{Y}(X_{valid}))$ are equal in distribution (e.g., two-sample Kolmogorov-Smirnov test). This measures whether the amount of learnt conditional dependency from $Z_{train}$ generalizes to $Z_{valid}$ at all.

In step 2, if machine 100 can reject the null, then machine 100 can be confident that there is signal in data and practitioners or downstream systems may try to optimize the modeling better. On the other hand, if machine 100 fails to do so, a practitioner or a downstream system may check whether the training pairs ($X_{train}$, $X_{train}$) are loaded and processed correctly. If machine 100 rejects the null in step 2, Applicants can proceed to the next step. In step 3, when the machine 100 reject the null, the machine 100 can determine that some performance degradation comes from validation time distribution shift—it is not because the approach focuses on non-robust features only.

If step 3 indicates that $Z_{train}$ and $Z_{valid}$ are different in distribution, one can naturally ask how different it is.

This is where step 4 is testing: machine 100 measures how $Z_{valid}$ deviates from $Z_{train}$ by comparing the learned neural network's prediction on $Z_{valid}$ and $Z'_{valid}$, the latter of which is not predictable at all.

Finally, Applicants emphasize that the testing procedure and machine 100 outcomes are model dependent—the testing result is only as good as the model itself. Applicants therefore suggest that practitioners should vary optimization hyper-parameters and model architectures as well as their capacities.

Together, the system has partially addressed the questions raised earlier. In step 2, if one can reject the null, then one can be confident that there is signal in data and one may try to optimize the modeling better. On the other hand, if there is a failure to do so, one may want to check whether the training pairs ($X_{train}$, $X_{train}$) are loaded and processed correctly. If one can reject the null in step 2, the approach can proceed to the next step. In step 3, when one rejects the null, it can be observed that some performance degradation comes from validation time distribution shift—it is not because the ML approach focuses on non-robust features only. If step 3 indicates that $Z_{train}$ and $Z_{valid}$ are different in distribution, one can naturally ask how different it is. This is where step 4 is testing: the approach measures how $Z_{valid}$ deviates from $Z_{train}$ by comparing the learned neural net's prediction on $Z_{valid}$ and $Z'_{valid}$, the latter of which is not predictable at all.

Finally, Applicants emphasize that the testing procedure is model dependent—the testing result is only as good as the model itself. Applicant therefore suggest that practitioners should vary optimization hyper-parameters and model architectures as well as their capacities.

FIG. 4 is a rendering 400 of an example machine learning failure analyzer graphical user interface, controlled to be rendered on a corresponding display, according to some embodiments. In this example, p-values are obtained and graphically represented.

The proposed approaches of various embodiments are applicable for supervised learning problems, and the example machine learning failure analyzer graphical user interface shown in rendering 400 is an example mechanism that can apply the approach in view of practical forecasting and classification problems that arise in technical implementation of machine learning architectures.

Take the banking sector as an example. Banks need to perform regression analysis and forecasting for various business lines. Many of the application areas, such as revenue forecast, macroeconomic variable forecast, credit need, whether a customer will return, etc. all fall into either regression or classification supervised learning problems. Moreover, the data are usually nonstationary tabular datasets with noisy targets. As a concrete instance, one can consider credit need forecast for a particular group of clients.

First, it is unclear what input variables/regressors should be included in the initial model development, so typically all inputs will be included in the initial stage. This makes the signal to noise ratio for the input variables very low. Second, the target for such datasets are noisy: there are many factors that determine a client's credit need, many of which are not collected in the data. This makes the signal to noise ratio even lower for the whole problem.

As a result, it is often hard to tell if a machine learning model has learnt enough information from the data so that it outperforms predictions using historical target value. In these cases, the data scientist needs to decide whether the problem should be investigated further (One hypothesis is that the data contains useful information, but the machine learning algorithm is incapable of modeling it. The other is that the data contains no useful information, but it is very hard to prove these to the colleagues: proving the dataset is useful requires only one working model, while disproving it can require an infinite amount of attempts).

At this point, one may use the method (and a corresponding tool) to unit test their learning algorithm. First, one may start with the Phase 0 for checking if their machine learning system code is written properly. The hypothesis is that their code can learn from a synthetic dataset with linear dependency. If this hypothesis is rejected, the data scientists may want to debug their code.

Second, after making sure the hypothesis test is passed in Phase 0, one moves to Phase 1 to check if there is any learnable signal from the real dataset. Note that at this stage, issues caused by model coding error have largely been eliminated, if the system still doesn't work it is natural to check if there are any issues with the datasets. The hypothesis is that there is learnable information in the dataset. If this hypothesis is rejected, the data scientists may want to check if there is data loading/preprocessing/etc. errors.

Third, after both model and data errors are removed, if one concludes that there is no learnable information, the project can be terminated confidently. Otherwise, one may proceed to check if the model generalizes or is robust to data distribution shifts. At this point, we are confident that the model can learn some pattern from data. The hypotheses are: 1. the machine learning system generalizes and 2. the machine learning system is robust to distribution shifts. These two are important as real world deployment environment often differs from the training dataset. In our example, the clients' credit need may slowly change over time, making the forecast less accurate and the need for constantly updating the model. If hypothesis 1. is rejected, the analyst may consider some regularization techniques (e.g. L2 weight penalization); if we fail to reject hypothesis 1. but hypothesis 2. is rejected, the analyst may consider using more recent data for the model training, or consider a different model class, to improve the system's robustness to distributional changes. If we fail to reject both hypotheses, the model is working in the sense of machine learning system. The data scientists can further optimize the performance in the deployment setting.

Applicant submits that automating this process with statistical guarantees, like the proposed approach, is much more efficient than having an analyst spending countless hours on investigating such problems, and often without any statistical guarantee.

The p-values can be provided through API 118 to a processor configured to control a display (e.g., a physical monitor screen) for rendering a graphical user interface 122 (e.g., an administrative dashboard). A practitioner is able to visualize and see, for example, on rendered meters whose needle graphics are controlled to have an angle based at least on the p-value. Other approaches for visualization are also possible, such as a scale of colors, sizes of drawn circles, etc. The p-values can be shown in textual form as well.

A failure estimate 402 is provided, for example, as in textual form so that an estimated reason for failure can be rendered as well on the screen. In some embodiments, other buttons or actuation mechanisms can be appended to the graphical user interface 112 such that the practitioner is able to initiate various downstream machine learning perturbation workflows, such as modifying hyperparameters, modifying initial conditions, re-running training with different approaches to iterative training, re-running training generally, among others. Initiating downstream workflows can include generating and sending command instruction sets through API 118 to machine learning re-training process 120, among others. In some embodiments, the GUI 122 is bypassed entirely and the practitioner (or other automated system) interacts directly through API 118. The machine 100 can be utilized early in training to see if training is working at all before scaling up or investing a large amount of resources into a particular model. In FIG. 4, the optional fourth p-value of some embodiments is noted. The fourth p-value is useful to determine whether test distribution is as unpredictable as random noise.

P-value 3 and p-value 4 belong to the third failure mode, which is a distribution shift—in the third failure mode, case 1—p-value 3, if one can reject the null—the null assumes there's no distribution shift, an analyst or a downstream system is able to guess that there's a research distribution shift.

The technical question after that will be to assess how significant is the shift. Case 1—p-value 4—if one can reject the null hypothesis in respect to p-value 4, a very small p-value indicates that even though there may be a shift, this shift might not be that significant.

In case 2, when the p-value 4 cannot reject the null hypothesis (e.g., large p-value), then it may be that there's a significant shift in the data distribution generation (e.g., pandemic).

In case 3, when p-value 3 indicates that there is little to no distribution shift, p-value 4 may not be particularly helpful.

Figure 5:
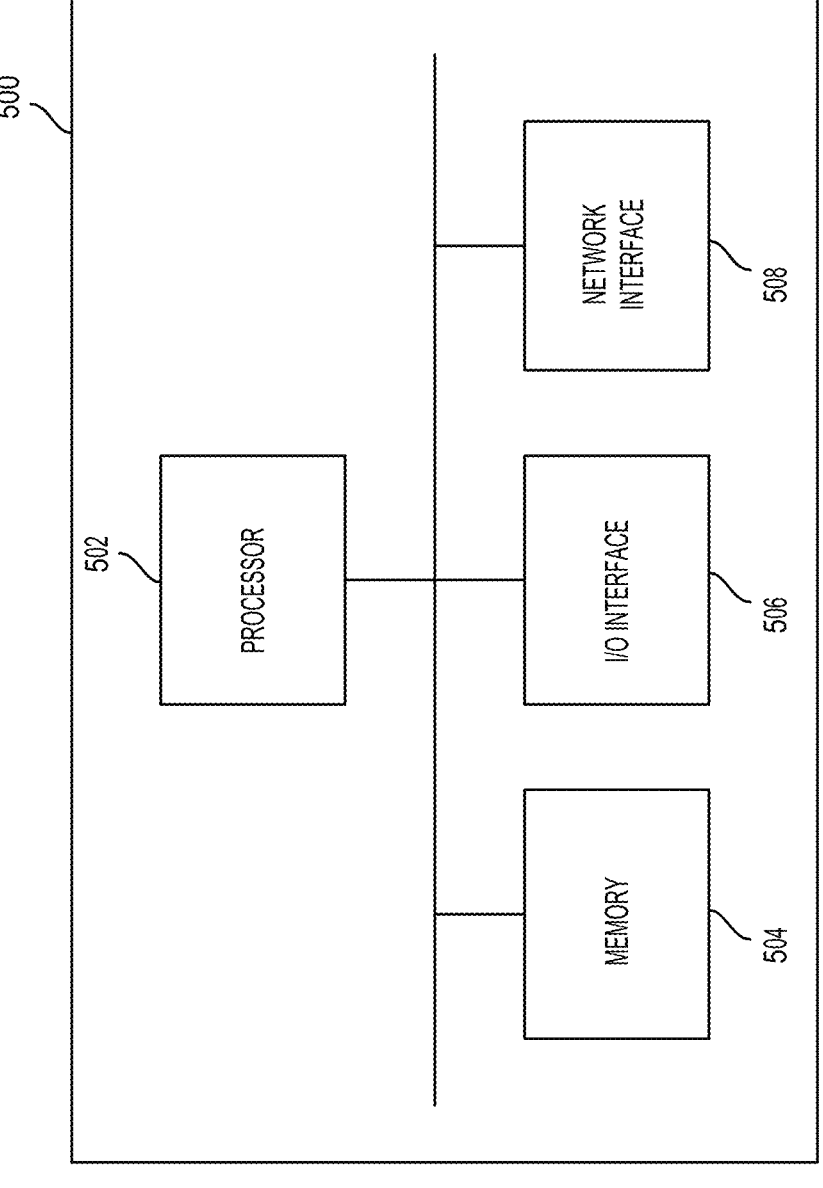
FIG. 5 is a block diagram of an example computing system, according to some embodiments.

FIG. 5 is a schematic diagram of a computing device 500 such as a computer server for implementing the automated machine learning failure discriminator machine 100. As depicted, the computing device includes at least one processor 502, memory 504, at least one I/O interface 506, and at least one network interface 508.

Processor 502 may be an Intel or AMD x86 or x64, PowerPC, ARM processor, or the like. Memory 504 may include a suitable combination of computer memory that is located either internally or externally such as, for example, random-access memory (RAM), read-only memory (ROM), compact disc read-only memory (CDROM).

Each I/O interface 506 enables computing device 500 to interconnect with one or more input devices, such as a keyboard, mouse, camera, touch screen and a microphone, or with one or more output devices such as a display screen and a speaker. This interface can be used, for example, for receiving command controls from the practitioner or from GUI 122.

Each network interface 508 enables computing device 500 to communicate with other components, for example, through API 118 to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others.

FIG. 6 is an illustration of a special purpose machine 602, according to some embodiments that may reside at a data center. The special purpose machine 602, for example, incorporates the features of the system 100 and is provided in a portable computing mechanism that, for example, may be placed into a data center as a rack server or rack server component that interoperates and interconnects with other devices, for example, across a network or a message bus.

The special purpose machine 602, in some embodiments, is a standalone automated machine learning failure discriminator machine 100 that can receive iteratively trained machine learning model inputs 102, and generate output data sets and data structures, which can then be surfaced for retrieval through API 118 (e.g., through a message bus 604).

When coupled to a message bus 604, the machine 602 can receive inputs in the form of data models and/or extracted curves in the form of data sets, and provide outputs in the form of p-values (e.g., pvalue1=0.00035, pvalue2=0.0045, pvalue3=0.7), Booleans (e.g., nullrejectTest1=TRUE, nullrejectTest2=TRUE, nullrejectTest3=TRUE, nullrejectTest4=FALSE), state estimations (failureReason=4, corresponding to failureReason="possible Distribution_Shift"), control messages (e.g., "ReRun_with_Perturbed_Hyperparameters (model7, desired_parameter_shift), "ReGenerate_Dataset (trainingdataset12, validationdataset12), among others.

These can be made available through API 118 or sent to downstream devices for controlling downstream actions (e.g., re-train, regenerate data sets, perturb parameters) in an attempt to rectify some of the issues. In a further embodiment, the machine 602 can operate in an automated mode where models are periodically validated (or validated based on triggers) and upon detection of a failure or a failure reason, the models or their training data is automatically modified and the model is re-run to see if a model performance can be improved.

The re-running of models can be an automated or semi-automated process and the p-values, for example, can be used as a feedback loop control mechanism, according to some embodiments.

REFERENCES

[1] Gneiting, Tilmann *Making and evaluating point forecasts*. Journal of the American Statistical Association 106.494 (2011): 746-762.

[2] Torgny, Lindvall *Lectures on the Coupling Method*. Courier Corporation, Jan. 1, 2002.

[3] Oden, Anders, and Hans Wedel. *Arguments for Fisher's permutation test*. The Annals of Statistics 3.2 (1975): 518-520.

[4] Efron, Bradley. *Bootstrap methods: another look at the jackknife*. Breakthroughs in statistics. Springer, New York, NY, 1992. 569-593.

[5] Koh, Pang Wei, and Percy Liang. *Understanding black-box predictions via influence functions*. Proceedings of the 34th International Conference on Machine Learning—Volume 70. JMLR. org, 2017.

[6] Zhang, Chiyuan, et al. *Understanding deep learning requires rethinking generalization*. International Conference on Learning—Representation, 2017.

[7] Sanjeev Arora, Simon S. Du, Wei Hu, Zhiyuan Li, Ruosong Wang *Fine-Grained Analysis of Optimization and Generalization for Overparameterized Two-Layer Neural Networks*. International Conference on Machine Learning (ICML) 2019.

[8] Wasserman, Larry. All of statistics: a concise course in statistical inference. Springer Science & Business Media, 2013.

[9] Weisberg, Sanford. Applied linear regression. Vol. 528. John Wiley Sons, 2013.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A machine-learning debugging tool for automated machine learning failure mode discrimination for an interactive machine learning model data architecture experiencing a failure for an unknown reason, the machine learning debugging tool comprising:

one or more processors operating in conjunction with computer memory and data storage, the one or more processors configured to:

instantiate a discriminator machine comprising a pre-processing discriminator machine learning network, a first discriminator machine learning network, and a second discriminator machine learning network that interoperate together to generate intermediate outputs representing values indicative of whether a null hypothesis for at least one failure type can be rejected, wherein the pre-processing discriminator machine learning network, the first discriminator machine learning network and the second discriminator machine learning network operate in parallel to improve computational efficiency and speed;

receive a data message indicative of an operational status of an iterative machine learning model data architecture;

upon detection of a failure of the iterative machine learning model data architecture from the data message, communicate across a coupled message bus to iteratively retrieve message frames or packets comprising, as an input data set, n-tuples representative of model training of the iterative machine learning model data architecture, the n-tuples representing validation loss curves extracted from the model training over a number of epochs;

process the input data set using a first discriminator machine learning network to generate a first intermediate data value representative of a first probability value of rejecting a first null hypothesis for a first failure type indicative of a conditional dependency in the iterative machine learning model data architecture between X and Y in respect of $Z=(X, Y)$, where Z is a data set of the iterative machine learning model data architecture, X is an input of the iterative machine learning model data architecture, and Y is a target or label of the iterative machine learning model data architecture;

process the input data set using a second discriminator machine learning network to generate a set of three loss curves, a first loss curve directed to an original validation dataset $Z_{valid}$, a second loss curve directed to a new validation data set spawned from an original training set $Z'_{valid}$, and a third loss curve directed to a target shuffled validation dataset $Z''_{valid}$;

generate a second intermediate data value representative of a second probability value of rejecting a second null hypothesis for a second failure type that $Z_{train,i}$ and $Z_{valid,i}$ are equal in distribution where $Z_{train,i}$ and $Z_{valid,i}$ are data sets generated from a training set and the validation set for the iterative machine learning model data architecture, respectively;

process the input data set using the second discriminator machine learning network to generate a third intermediate data value representative of a third probability value of rejecting a third null hypothesis for a third failure type that convergence rates $R_{train}$ vs $R_{valid}$ are equal in distribution, indicative of whether measuring an amount of learnt conditional dependency from $Z_{train}$ generalizes to $Z_{valid}$;

generate an output data structure encapsulating the first, second, and third probability values, wherein the output data structure indicates a failure type value representing one of the first failure type, the second failure type, and the third failure type;

expose the output data structure through an application programming interface to facilitate communication and processing of the output data structure by downstream systems to debug and rectify the failure based on the failure type value indicated by the output data structure, wherein the iterative machine learning model data architecture can be re-trained using the output data structure to improve at least one of accuracy, convergence rate, and reduced total number of processing cycles of the iterative machine learning model data architecture; and control rendering of a graphical user interface including a plurality of interactive graphical interface control elements having graphical rendering characteristics controlled based on the first probability value, the second probability value, and the third probability value.

2. The machine-learning debugging tool of claim 1, wherein the first discriminator machine learning network is configured to generate the first intermediate data value by:

create n/k subsamples of $$\{Z_{train,i}\}_{i=1}^{n}$$

by randomly removing k points to establish n/k simulated distributions of training datasets, each with n−k samples such that $$\{Z_{train,i}\}_{i=1}^{n}$$

is utilized as a population;

for each subsample $$\{Z_{train}^{i,j}\}_{i=1,j=1}^{n-k,\frac{n}{k}},$$

shuffle a target Y to obtain $$\{Z_{train}'^{ij}\}_{i=1,j=1}^{n-k,n/k};$$

train the iterative machine learning model data architecture on both $$\{Z_{train}^{i,j}\}_{i=1,j=1}^{n-k,\frac{n}{k}} \text{ and } \{Z_{train}'^{i,j}\}_{i=1,j=1}^{n-k,\frac{n}{k}}$$

on one epoch of the original training dataset across a set of mini-batches B to obtain a set of training loss curves;

determine a convergence rate for each case of the n/k cases based on the set of training loss curves; and compare the loss curves for $Z_{train}$ and $Z'_{train}$ to obtain the first intermediate data value.

3. The machine-learning debugging tool of claim 1, wherein the second discriminator machine learning network is configured to generate the second and third intermediate data values by:

randomly sample m data points from $$\{Z_{train,i}\}_{i=1}^{n} \text{ to form } \{Z'_{valid,i}\}_{i=1}^{m};$$

generates a new training data set from remaining n−m data points, the new training dataset denoted as $$\{Z'_{train,i}\}_{i=1}^{n-m};$$

shuffle a target Y in $$\{Z'_{valid,i}\}_{i=1}^{m} \text{ to obtain } \{Z''_{valid,i}\}_{i=1}^{m};$$

pick k out of $C_m^n$ sub-sampled datasets and train the iterative machine learning model data architecture across the set of mini-batches B, wherein after mini-batch iteration, validation losses for $$\{Z_{valid,i}\}_{i=1}^{m}, \{Z'_{valid,i}\}_{i=1}^{m}, \text{ and } \{Z''_{valid,i}\}_{i=1}^{m}$$

are computed as $$(\mathcal{L}_{valid,t}^{1}, \mathcal{L}_{valid,t}^{2}, \mathcal{L}_{valid,t}^{3}),$$

where t denotes the tth mini-batch iteration to generate the set of three loss curves.

4. The machine-learning debugging tool of claim 1, wherein each n-tuple includes at least a 1st element representative of a normal training loss curve; a 2nd element representative of a training loss curve with Y shuffled; a 3rd element representative of a normal validation loss curve, split from original training; a 4th element representative of a normal testing loss curve; and a 5th element representative of a test loss curve with Y shuffled.

5. The machine-learning debugging tool of claim 1, wherein w the first discriminator machine learning network and the second discriminator machine learning network are each operated on separate parallel computing infrastructure such that the first discriminator machine learning network and the second discriminator machine learning network are operated contemporaneously.

6. The machine-learning debugging tool of claim 1, wherein the processor is further configured to generate a fourth data value representative of a fourth probability value representing whether a test distribution is as unpredictable as random noise, if trained from the training dataset; and the output data structure further encapsulates the fourth probability value.

7. The machine-learning debugging tool of claim 1, wherein the output data structure is made available on an application programming interface; and wherein the output data structure is utilized for rendering a graphical user interface having one or more user interactive control elements having adaptable visual characteristics based at least on the values stored in the output data structure, wherein the one or more user interactive control elements include buttons and actuation mechanisms, wherein the one or more user interactive control elements are used to initiate downstream machine learning workflows.

8. The machine-learning debugging tool of claim 1, wherein the processor is further configured to operate automatically such that the iterative machine learning model data architecture is validated periodically, and upon detection of the failure, automatically modify and re-validate the iterative machine learning model data architecture using the output data structure to create an automatic feedback loop control to improve at least one of accuracy, convergence rate, and reduced total number of processing cycles of the iterative machine learning model data architecture.

9. The machine-learning debugging tool of claim 1, wherein the output data structure is provided to a downstream system which processes the output data structure to generate control commands to modify training parameters of the iterative machine learning model data architecture for re-training the iterative machine learning model data architecture to rectify the failure based on the failure type value, wherein the output data structure is provided to the downstream system by generating and sending command instruction sets through the application programming interface to the downstream system.

10. The machine-learning debugging tool of claim 1, wherein the one or more processors are further configured to pre-process the input data set using a pre-processing discriminator machine learning network that couples dataset $Z=(X, Y)$ with a synthetic dataset $\tilde{Z}=(\tilde{X}, \tilde{Y})$ and compares learning behavior to generate a data output for encapsulating into the output data structure representative of whether Z is able to achieve comparable performance to least squares on a dataset with linear conditional dependency.

11. A method for automated machine learning failure mode discrimination for an interactive machine learning model data architecture experiencing a failure for an unknown reason, the method comprising:

instantiating a discriminator machine learning network machine comprising a pre-processing discriminator machine learning network, a first discriminator machine learning network, and a second discriminator machine learning network that interoperate together to generate intermediate outputs representing values indicative of whether a null hypothesis for at least one failure type can be rejected, wherein the pre-processing discriminator machine learning network, the first discriminator machine learning network and the second discriminator machine learning network operate in parallel to improve computational efficiency and speed;

upon detection of a failure of an iterative machine learning model data architecture, communicating across a coupled message bus to iteratively retrieve message frames or packets comprising, as an input data set, n-tuples representative of model training of an iterative machine learning model data architecture, the n-tuples representing validation loss curves extracted from the model training over a number of epochs;

processing the input data set using a first discriminator machine learning network to generate a first intermediate data value representative of a first probability value of rejecting a first null hypothesis for a first failure type indicative of a conditional dependency in the iterative machine learning model data architecture between X and Y in respect of $Z=(X, Y)$, where Z is a data set of the iterative machine learning model data architecture, X is an input of the iterative machine learning model data architecture, and Y is a target or label of the iterative machine learning model data architecture;

processing the input data set using a second discriminator machine learning network to generate a set of three loss curves, a first loss curve directed to an original validation dataset $Z_{valid}$, a second loss curve directed to a new validation data set spawned from an original training set $Z'_{valid}$, and a third loss curve directed to a target shuffled validation dataset $Z''_{valid}$;

generating a second intermediate data value representative of a second probability value of rejecting a second null hypothesis for a second failure type that $Z_{train,i}$ and $Z_{valid,i}$ are equal in distribution where $Z_{train,i}$ and $Z_{valid,i}$ are data sets generated from a training set and the validation set for the iterative machine learning model data architecture, respectively;

processing the input data set using the second discriminator machine learning network to generate a third intermediate data value representative of a third probability value of rejecting a third null hypothesis for a third failure type that convergence rates $R_{train}$ VS $R_{valid}$ are equal in distribution, indicative of whether measuring an amount of learnt conditional dependency from $Z_{train}$ generalizes to $Z_{valid}$;

generating an output data structure encapsulating the first, second, and third probability values, wherein the output data structure indicates a failure type value representing one of the first failure type, the second failure type, and the third failure type;

exposing the output data structure through an application programming interface to facilitate communication and processing of the output data structure by downstream systems to debug and rectify the failure based on the failure type value indicated by the output data structure, wherein the iterative machine learning model data architecture can be re-trained using the output data structure to improve at least one of accuracy, convergence rate, and reduced total number of processing cycles of the iterative machine learning model data architecture; and controlling rendering of a graphical user interface including a plurality of interactive graphical interface control elements having graphical rendering characteristics controlled based on the first probability value, the second probability value, and the third probability value.

12. The method of claim 11, wherein the first discriminator machine learning network is configured to generate the first intermediate data value by:

creating n/k subsamples of $$\{Z_{train,i}\}_{i=1}^{n}$$

by randomly removing k points to establish n/k simulated distributions of training datasets, each with n−k samples such that $$\{Z_{train,i}\}_{i=1}^{n}$$

is utilized as a population;
for each subsample $$\{Z_{train}^{i,j}\}_{i=1,j=1}^{n-k,\frac{n}{k}},$$

shuffling a target Y to obtain $$\{Z'_{train}^{i,j}\}_{i=1,j=1}^{n-k,n/k};$$

training the iterative machine learning model data architecture on both $$\{Z_{train}^{i,j}\}_{i=1,j=1}^{n-k,\frac{n}{k}} \text{ and } \{Z'_{train}^{i,j}\}_{i=1,j=1}^{n-k,\frac{n}{k}}$$

on one epoch of the original training dataset across a set of mini-batches B to obtain a set of training loss curves; determining a convergence rate for each case of the n/k cases based on the set of training loss curves; and comparing the loss curves for $Z_{train}$ and $Z'_{train}$ to obtain the first intermediate data value.

13. The method of claim 11, wherein the second discriminator machine learning network is configured to generate the second and third intermediate data values by:
   randomly sampling m data points from $$\{Z_{train,i}\}_{i=1}^{n} \text{ to form } \{Z'_{valid,i}\}_{i=1}^{m};$$

generating a new training data set from remaining n−m data points, the new training dataset denoted as $$\{Z'_{train,i}\}_{i=1}^{n-m};$$

shuffling a target Y in $$\{Z'_{valid,i}\}_{i=1}^{m} \text{ to obtain } \{Z''_{valid,i}\}_{i=1}^{m};$$

and
   picking k out of $$C_m^n$$

sub-sampled datasets and train the iterative machine learning model data architecture across the set of mini-batches B, wherein after mini-batch iteration, validation losses for $$\{Z_{valid,i}\}_{i=1}^{m}, \{Z'_{valid,i}\}_{i=1}^{m}, \text{ and } \{Z''_{valid,i}\}_{i=1}^{m}$$

are computed as $$(\mathcal{L}_{valid,t}^{1}, \mathcal{L}_{valid,t}^{2}, \mathcal{L}_{valid,t}^{3}),$$

where t denotes the tth mini-batch iteration to generate the set of three loss curves.

14. The method of claim 11, wherein each n-tuple includes at least a 1st element representative of a normal training loss curve; a 2nd element representative of a training loss curve with Y shuffled; a 3rd element representative of a normal validation loss curve, split from original training; a 4th element representative of a normal testing loss curve; and a 5th element representative of a test loss curve with Y shuffled.

15. The method of claim 11, wherein the first discriminator machine learning network and the second discriminator machine learning network are each operated on separate parallel computing infrastructure such that the first discriminator machine learning network and the second discriminator machine learning network are operated contemporaneously.

16. The method of claim 11, comprising generating a fourth data value representative of a fourth probability value representing whether a test distribution is as unpredictable as random noise, if trained from the training dataset; and wherein the output data structure further encapsulates the fourth probability value.

17. The method of claim 11, wherein the output data structure is made available on an application programming interface; and wherein the output data structure is utilized for rendering a graphical user interface having one or more user interactive control elements having adaptable visual characteristics based at least on the values stored in the output data structure, wherein the one or more user interactive control elements include buttons and actuation mechanisms, wherein the one or more user interactive control elements are used to initiate downstream machine learning workflows.

18. The method of claim 11, wherein the iterative machine learning model data architecture is automatically validated periodically, and upon detection of the failure, automatically modified and re-validated using the output data structure to create an automatic feedback loop control to improve at least one of accuracy, convergence rate, and reduced total number of processing cycles of the iterative machine learning model data architecture.

19. The method of claim 11, further comprising pre-processing the input data set using a pre-processing discriminator machine learning network that couples dataset Z=(X, Y) with a synthetic dataset $\tilde{Z}=(\tilde{X}, \tilde{Y})$ and compares learning behavior to generate a data output for encapsulating into the output data structure representative of whether Z is able to achieve comparable performance to least squares on a dataset with linear conditional dependency.

20. A non-transitory computer readable medium storing machine interpretable instructions for automated machine learning failure discrimination, the machine interpretable instructions, when executed by a processor, cause the processor to perform steps of a method for automated machine learning failure mode discrimination for an interactive machine learning model data architecture experiencing a failure for an unknown reason, the method comprising:
   instantiating a discriminator machine learning network machine comprising a pre-processing discriminator machine learning network, a first discriminator machine learning network, and a second discriminator machine learning network that interoperate together to generate intermediate outputs representing values indicative of whether a null hypothesis for at least one failure type can be rejected, wherein the pre-processing discriminator machine learning network, the first discriminator machine learning network and the second discriminator machine learning network operate in parallel to improve computational efficiency and speed;

upon detection of a failure of an iterative machine learning model data architecture, communicating across a coupled message bus to iteratively retrieve message frames or packets comprising, as an input data set, n-tuples representative of model training of an iterative machine learning model data architecture, the n-tuples representing validation loss curves extracted from the model training over a number of epochs;

processing the input data set using a first discriminator machine learning network to generate a first intermediate data value representative of a first probability value of rejecting a first null hypothesis for a first failure type indicative of a conditional dependency in the iterative machine learning model data architecture between X and Y in respect of Z=(X, Y), where Z is a data set of the iterative machine learning model data architecture, X is an input of the iterative machine learning model data architecture, and Y is a target or label of the iterative machine learning model data architecture;

processing the input data set using a second discriminator machine learning network to generate a set of three loss curves, a first loss curve directed to an original validation dataset $Z_{valid}$, a second loss curve directed to a new validation data set spawned from an original training set $Z'_{valid}$, and a third loss curve directed to a target shuffled validation dataset $Z''_{valid}$;

generating a second intermediate data value representative of a second probability value of rejecting a second null hypothesis for a second failure type that $Z_{train,i}$ and $Z_{valid,i}$ are equal in distribution where $Z_{train,i}$ and $Z_{valid,i}$ are data sets generated from a training set and the validation set for the iterative machine learning model data architecture, respectively;

processing the input data set using the second discriminator machine learning network to generate a third intermediate data value representative of a third probability value of rejecting a third null hypothesis for a third failure type that convergence rates $R_{train}$ VS $R_{valid}$ are equal in distribution, indicative of whether measuring an amount of learnt conditional dependency from $Z_{train}$ generalizes to $Z_{valid}$;

generating an output data structure encapsulating the first, second, and third probability values, wherein the output data structure indicates a failure type value representing one of the first failure type, the second failure type, and the third failure type; and exposing to the output data structure through an application programming interface to facilitate communication and processing of the output data structure by downstream systems to debug and rectify the failure based on the failure type value indicated by the output data structure, wherein the iterative machine learning model data architecture can be re-trained using the output data structure to improve at least one of accuracy, convergence rate, and reduced total number of processing cycles of the iterative machine learning model data architecture; and controlling rendering of a graphical user interface including a plurality of interactive graphical interface control elements having graphical rendering characteristics controlled based on the first probability value, the second probability value, and the third probability value.

* * * * *